US007882046B1

(12) United States Patent
Kizhakkekalathil et al.

(10) Patent No.: US 7,882,046 B1
(45) Date of Patent: Feb. 1, 2011

(54) PROVIDING AD INFORMATION USING PLURAL CONTENT PROVIDERS

(75) Inventors: Raj K. Kizhakkekalathil, Sammamish, WA (US); Karen R. Haberkorn, Seattle, WA (US); Llewllyn J. Mason, Seattle, WA (US); Brian J. Schuster, Seattle, WA (US); Richard J. Cole, Seattle, WA (US); Mike Perkowitz, Seattle, WA (US); Mark Jacobson, Seattle, WA (US); Andrew B. Dickinson, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 453 days.

(21) Appl. No.: 11/694,699

(22) Filed: Mar. 30, 2007

Related U.S. Application Data

(60) Provisional application No. 60/865,401, filed on Nov. 10, 2006, provisional application No. 60/865,442, filed on Nov. 12, 2006.

(51) Int. Cl.
G06F 15/18 (2006.01)
(52) U.S. Cl. ...................................................... 706/12
(58) Field of Classification Search .................. 705/14; 706/12
See application file for complete search history.

(56) References Cited

U.S. PATENT DOCUMENTS

| | | | | |
|---|---|---|---|---|
| 5,933,811 | A * | 8/1999 | Angles et al. | 705/14 |
| 7,428,555 | B2 * | 9/2008 | Yan | 707/104.1 |
| 2004/0059708 | A1 * | 3/2004 | Dean et al. | 707/1 |
| 2004/0143499 | A1 * | 7/2004 | Dietsch et al. | 705/14 |
| 2004/0153373 | A1 | 8/2004 | Song et al. | |
| 2004/0252027 | A1 | 12/2004 | Torkkola et al. | |
| 2005/0021397 | A1 * | 1/2005 | Cui et al. | 705/14 |
| 2005/0187823 | A1 | 8/2005 | Howes | |
| 2006/0085248 | A1 | 4/2006 | Arnett et al. | |
| 2006/0167749 | A1 * | 7/2006 | Pitkow et al. | 705/14 |
| 2007/0192194 | A1 | 8/2007 | O'Donnell et al. | |
| 2007/0233556 | A1 * | 10/2007 | Koningstein | 705/14 |
| 2007/0260520 | A1 * | 11/2007 | Jha et al. | 705/14 |
| 2008/0004950 | A1 * | 1/2008 | Huang et al. | 705/14 |
| 2008/0004951 | A1 * | 1/2008 | Huang et al. | 705/14 |
| 2008/0027798 | A1 | 1/2008 | Ramamurthi et al. | |
| 2008/0162371 | A1 * | 7/2008 | Rampell et al. | 705/80 |

OTHER PUBLICATIONS

Francis Bellamy, "Effective Magazine Advertising", 1909, Mitchell Kennerley, pp. 105, 113.*

* cited by examiner

*Primary Examiner*—Michael B. Holmes
*Assistant Examiner*—Vincent M Gonzales
(74) *Attorney, Agent, or Firm*—Lee & Hayes, PLLC

(57) ABSTRACT

An ad system is described for providing ad selections in response to an ad presentation opportunity. The ad system can use multiple content providers to generate multiple sets of ad candidates. The content providers can apply different ad selection paradigms in generating their sets of ad candidates. The paradigms may act on different aspects of a context pertaining to the ad presentation opportunity. A chooser module and filtering module can cull the set of ad selections from among the plural sets of ad candidates. At least one content provider uses machine learning functionality in generating ad candidates, such as a Naïve Bayesian approach, an affiliate similarity approach, etc. Various content providers also find application in a stand-alone mode.

35 Claims, 15 Drawing Sheets

PROVIDING AD INFORMATION USING PLURAL CONTENT PROVIDERS

This application claims the benefit of U.S. Provisional Application No. 60/865,401, filed on Nov. 10, 2006, and U.S. Provisional Application No. 60/865,442, filed on Nov. 12, 2006. Both of these Provisional Applications are incorporated by reference herein in their respective entireties.

This Application is also related to commonly assigned U.S. Non-Provisional application Ser. No. 11/694,668, entitled "Providing Ad Information Using Machine Learning Selection Paradigms," filed on the same date as the present application. This Non-Provisional Application is incorporated by reference herein in its entirety.

BACKGROUND

The presentation of advertisements ("ads") via network-accessible electronic services is now ubiquitous. In one well known model, an advertising system can present ads in response to the content-related characteristics of information received from (or delivered to) a user. For example, the advertising system can present an ad for a swim suit in response to the user's entry of a search term "beach" into a search engine interface. As a result of this provision, the end user may receive an ad that is potentially related to the current context of the user's interaction with an electronic service.

The above types of advertising systems are not without their shortcomings. For instance, the user's interests may not always correlate well with the content-related characteristics of the user's interaction with an electronic service. Accordingly, an advertising system which relies solely on this consideration may provide uneven performance.

In general, it would be desirable to provide an ad delivery system that is more robust and flexible than the above-described systems. It would also be desirable to provide an ad delivery system which better accommodates alternative types of contractual relationships that may exist among network-enabled entities.

SUMMARY

In one illustrative implementation, an ad-serving environment is described that includes an item management module, a plurality of affiliate modules, and an ad system. In one case, the item management module may correspond to an online merchant of goods and services. In one case, each affiliate module may correspond to a third party website with which a user may interact. The ad system corresponds to functionality for delivering one or more ad selections to a user in the context of the user's interaction with an affiliate module.

According to one illustrative implementation, the ad system generates ad selections for a user in response to an ad presentation opportunity. The ad presentation opportunity, in turn, is represented by an ad opportunity signature, which expresses various attributes of the ad presentation opportunity. The ad presentation opportunity occurs in the context of the user's interaction with an electronic service provided by an affiliate module. This context has multiple aspects. The ad system may generate ad selections for presentation based on one or more aspects of the context, including a content-related aspect, an affiliate-related aspect, and a user-related aspect. The content-related aspect pertains to one or more characteristics of content being imparted or received by the affiliate module. The affiliate-related aspect pertains to one or more characteristics of the affiliate module. The user-related aspect pertains to one or more characteristics of the user who is interacting with the affiliate module.

More specifically, according to one illustrative implementation, the ad system includes an ad selection module for generating ad selections and an ad serving module for delivering the ad selections to the user. The ad selection module can include plural content providers. The content providers provide respective sets of ad candidates based on different respective selection paradigms. For instance, in generating ad candidates, different content providers may emphasize different aspects of the context of the ad presentation opportunity. The ad selection module includes a chooser module for culling a chosen set of ad candidates from among the plural sets of ad candidates generated by the different content provider modules. The ad selection module may perform this task by applying different weights to the content providers, thereby effectively favoring the ad candidates generated by some content providers over others. The ad selection module can also include an optional filtering module for further refining a set of chosen ads provided by the chooser module. The filtering performed by the filtering module is based on a filtering criterion or a combination of filtering criteria.

The ad system includes learning functionality that is operative to modify different aspects of the ad-serving environment's behavior based on actions taken by users and/or other factors. For example, the ad system can collect information regarding the relative success of ad selections in eliciting some type of desired user action (e.g., click events, purchases, etc.) or in achieving some other desired aim. Based on this performance data, the ad system can modify the way it operates to better promote a desired aim or aims.

For instance, one or more content providers can incorporate learning functionality in the form of model-based machine learning functionality. Such a content provider can construct a model which maps ad opportunity signatures to the observed performance of the content provider. The observed performance of the content provider may be reflected by actual ad candidates generated by the content provider in response to the ad opportunity signatures, together with and indication of whether these ad candidates were successful in achieving a desired aim (or aims). The content provider can use this model to map new ad opportunity signatures into one or more ad candidates that are likely to achieve the desired aim (or aims). The content provider can update its model as new performance data is obtained.

The chooser module can also incorporate learning functionality, e.g., in the form of the above-described model-based machine learning functionality. For example, the chooser module can use a model which weights the ad candidates generated by multiple content providers. Upon determining that a favorably-weighted content provider is generating ad selections that have not been successful in eliciting click events or sales (or in meeting any other aim or aims), the chooser module can decrease the relative weighting applied to this content provider.

One type of content provider uses machine learning functionality that adopts a Naïve Bayesian approach to generate ad candidates. This type of content provider constructs a model using the Naïve Bayes approach. The content provider then uses the Naïve Bayes model to map new ad opportunity signatures to ad candidates.

Another type of content provider uses a model that leverages similarity among two or more affiliate modules to generate ad candidates. More specifically, this model forms clusters of affiliate modules that have similar candidate-generating behavior, and then uses the collective selections generated by these clusters to generate ad candidates for any member of these clusters. Assume, for example, that a user is interacting with affiliate module X. The model can identify that affiliate X belongs to a group of similar affiliate modules and then generate ad candidates that have historically proven appropriate for this group.

In general, the content providers are set-forth herein in the context of the above-described framework that includes multiple content providers and a chooser module. The content providers can also be used in other kinds of frameworks. Further, each of the content providers can also be used as a stand-alone provider to generate ad candidates.

Additional illustrative implementations and features are described in the following.

Figure 1:
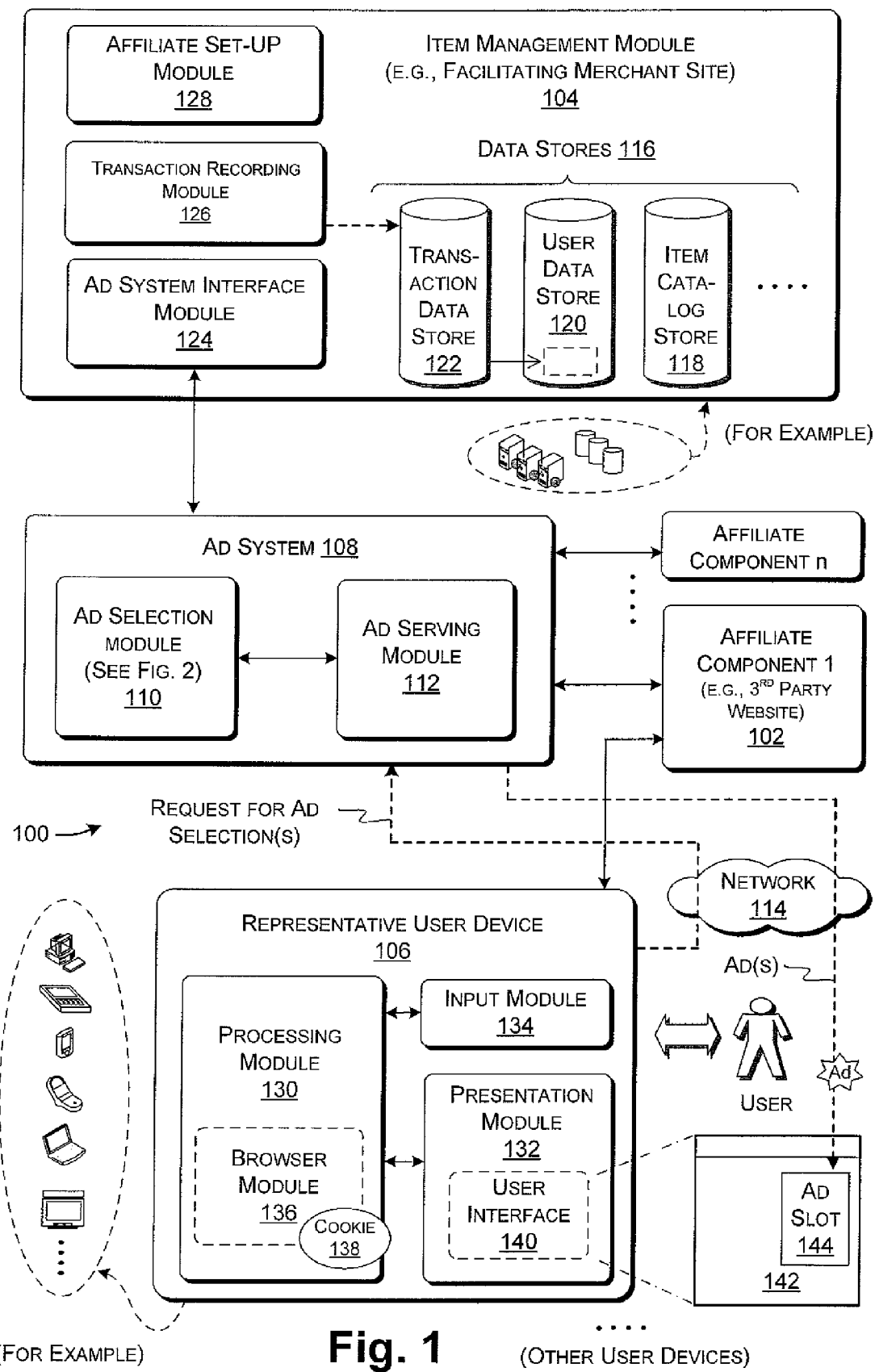
FIG. 1 shows an illustrative ad-serving environment, including an ad system for delivering ad selections to users in the context of electronic services provided by a plurality of affiliate modules.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure sets forth a strategy for presenting ad information to users. The strategy can be manifested in various systems, apparatuses, methods, protocols, computer readable mediums, data structures, and other forms. This disclosure includes the following sections. Section A describes an illustrative system for delivering ad selections to users. Section B describes illustrative procedures that explain the operation of the system of Section A. By way of overview, the systems and procedures set forth a way of generating ad selections using plural content providers. The content providers generate respective sets of ad candidates based on a context associated with an ad presentation opportunity. Each content provider may use a different paradigm to generate a set of ad candidates. A chooser module selects from the plural sets of ad candidates to form a chosen set of ad candidates. A filtering module can apply at least one filtering criterion to further refine the chosen ad candidates into a set of one or more ad selections for presentation to a user.

One or more content providers can incorporate the use of machine learning functionality. For instance, one of the content providers uses a Naïve Bayesian model to generate a set of ad candidates. Another of the content provides uses a clustering technique that identifies related affiliate modules to generate a set of ad candidates.

The term "ad information" is intended to have broad connotation. In one case most often evoked herein, the term "ad information" refers to any kind of information that corresponds to one or more merchandisable items, where the ad information is presented to elicit a sale of one or more items. In other cases, the term "ad information" refers to data that imparts only informational content to a user (that is, without attempting to sell a merchandisable item to the user). Information which conveys a political or community-interest message is an example of an ad that is not attempting to sell a merchandisable item for profit. Thus, the term "ad information" should be construed to encompass any kind of information that is disseminated to users for any purpose.

The term "item" itself also has broad connotation as used herein. In one example, an item may refer to something that can be acquired or more generally consumed by the user, such as media content (a book, a musical piece, etc.), other tangible article (e.g., an automobile, a camera, clothing article, etc.), a service, downloadable digital content of any nature, and so forth.

Ad information can be delivered to a user in the form of discrete units, referred to herein as "ad units." In one case, an ad unit may correspond to a single ad associated with an ad presentation opportunity. Each ad unit can include one or more parts. In one case, for example, an ad unit can include a creative part and one or more featured item parts. The creative part generally governs the manner in which an ad unit conveys its message, while a featured item part may correspond to a substantive message that is being conveyed. For example, the creative part may define the visual appearance of the ad unit, the functional behavior of the ad unit, and so on. A featured item part may correspond to a merchandisable item or some other focal point of an ad unit's message. In one case, an ad unit can use a creative part that accommodates the presentation of a single featured item part. In another case, an ad unit can use a creative part that accommodates the presentation of plural featured item parts.

The term "ad candidate" refers to any kind of ad information unit that is proposed for presentation to a user. An ad candidate can correspond to an ad unit or a part of an ad unit, or some combination of units and/or parts. The term "ad selection" refers to any kind of ad information that has been selected for presentation to a user. An ad selection can correspond to an ad unit or a part of an ad unit, or some combination of units and/or parts.

A. Illustrative Systems

As a preliminary matter, the terms logic, module, component, functionality, or system (or the like) generally represent hardware, software, firmware or a combination of these elements, or yet some other kind of implementation. For instance, in the case of a software implementation, the terms logic, module, component, functionality, or system (or the like) represent program code that perform specified tasks when executed on a processing device or devices (e.g., CPU or CPUs). The program code can be stored in one or more machine-readable media.

The term machine-readable media or the like refers to any kind of medium for retaining information in any form, including various kinds of storage devices (magnetic, optical, static, etc.). The term machine-readable media also encompasses transitory forms of representing information, including various hardwired and/or wireless links for transmitting the information from one point to another.

A.1. Overview of the System

FIG. 1 shows one illustrative ad-serving environment 100 ("environment") for delivering ad units to users. This subsection provides an overview of the environment 100, including its various modules. The following subsections provide additional illustrative details regarding individual modules in the environment 100.

The environment 100 includes a network of affiliate modules (including representative affiliate module 102). The affiliate modules can correspond to websites, individual web pages, or other network-accessible functionality for providing electronic services of any kind to users. For example, the representative affiliate module 102 can provide an electronic service that performs one of more of: selling items of any type; disseminating information of any type; facilitating message exchange among users (e.g., in the form of a chat service); providing a message-posting board (e.g., in the form of a "blog"); conducting network searches, and so on. A user may access the electronic service associated with the affiliate module 102 by activating a network address of the affiliate module 102 in any way (e.g., by typing in the address, clicking on a link, etc.).

The environment 100 also includes an item management module 104. The item management module 104 can represent any kind of functionality for managing any kind of item that can be consumed by a user. A user may directly access the electronic service associated with the item management module 104 by activating the network address of the item management module in any manner or by being redirected to the item management module 104 via an affiliate module's website. In one implementation, the entity which administers the item management module 104 differs from the entities which administer the affiliate modules. But in other cases, a single entity may administer (and/or own) the item management module 104 and one or more affiliate modules. Similarly, the affiliate modules can be administered by different respective entities; alternatively, or in addition, one or more affiliate modules can be administered by the same entity. Further information regarding modules that can be used to implement the item management module 104 is provided below.

The environment 100 also includes a plurality of user devices (including representative user device 106). Users may interact with the affiliate modules and the item management module 104 via the user devices. As will be described below, the user devices can comprise personal computers or other types of processing devices.

According to one business model, entities associated with the affiliate modules may contract with an entity associated with the item management module 104 to use the affiliate modules to deliver ad units to users. The ad units are associated with items being offered by the item management module 104. In return, the entity associated with the item management module 104 may agree to allocate revenue to the entities associated with the affiliate modules. The allocated revenue may be proportional to how successful the ad units are in eliciting desired user actions or may be based on some other criterion or combination of criteria. For example, the entity associated with the item management module 104 may reward an entity associated with an affiliate module with a fraction of the revenue it earns through the sale of its items, providing that such sales are provoked by the presentation of corresponding ad units via the electronic service offered by the affiliate module. Note that the affiliate modules can be considered "affiliates" of the item management module 104 by virtue of such agreement to cooperate with the item management module 104 in the delivery of ad units to users. The affiliate modules can also be referred to as "associate modules" in the sense that these modules are associated with the item management module 104.

The item management module 104 can maintain proper accounting of transactions that have some identifiable nexus to the presentation of ad units by the affiliate modules. For example, the ad units that are presented by the affiliate modules can include tracking information. When a user activates an ad unit provided by a particular affiliate module, the ad-serving environment 100 may redirect the user to a website associated with the item management module 104. In doing so, the ad-serving environment 100 can also forward the tracking information to the item management module 104. Upon being redirected to the item management module 104, the user can potentially make a revenue-accruing action, such as by purchasing the advertised good or service or purchasing some other good or service or taking any other action. The item management module 104 can use this tracking information to earmark this transaction as having its origin in an ad unit that was presented by the particular affiliate module. The affiliate module can be compensated based on this accounting event.

In one illustrative implementation, the environment 100 can operate based on a cost-per-sale accounting paradigm. This is because, as described above, the environment 100 can assess revenue based on express purchase-related actions taken by users. In another implementation, the environment 100 can also (or alternatively) operate using a cost-per-click accounting model. In this model, the environment 100 assesses revenue based on selections made by users (which may not involve a purchase). In another implementation, the environment 100 can also (or alternatively) operate using a cost-per-impression accounting model. In this model, the environment 100 assesses revenue based on the presentation of ad units to users (regardless of whether users act on the ad units). Other implementations can use other types of accounting paradigms or combinations of paradigms. It should be noted that the ad processing features described herein are not limited to any type of accounting paradigm.

In still other cases, the features described herein can be applied to environments in which there is no pre-existing agreement between the item management module 104 and the affiliate modules. In other cases, the features described herein can be applied to environments which include other entities in addition to the affiliate modules and the item management module 104. In other cases, the features described herein can be applied to environments which omit the affiliate modules and/or the item management module 104. For example, various features can be applied to an environment in which ad units are served to the user devices in the context of the content provided by the item management module 104, rather than in the context of content provided by the affiliate modules.

Figure 2:
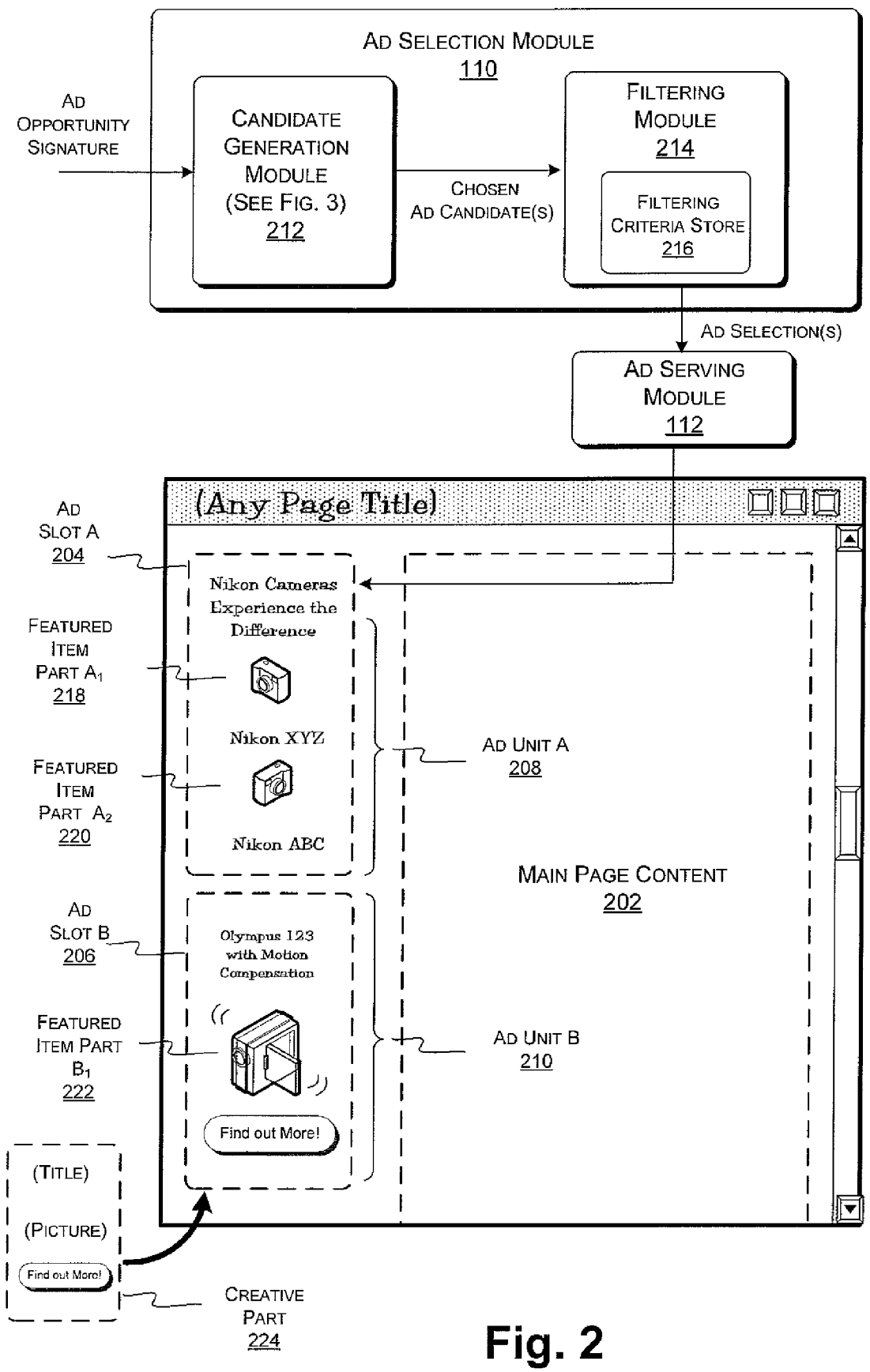
FIG. 2 shows an illustrative ad selection module for use in the ad system of FIG. 1.
Figure 3:
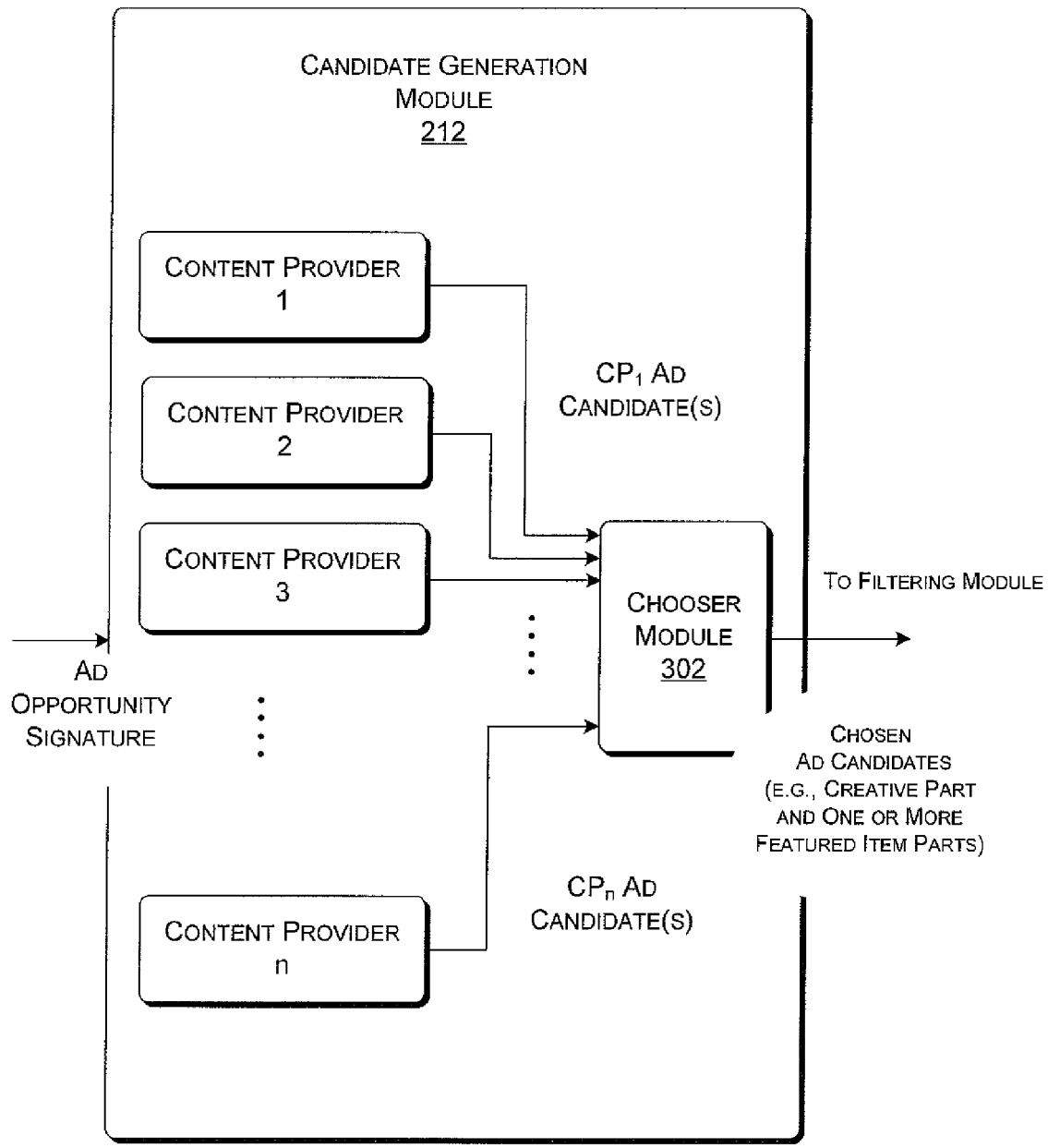
FIG. 3 shows an illustrative candidate generation module for use in the ad selection module of FIG. 2.

The system 100 also includes an ad system 108. The purpose of the ad system 108 is to deliver ad selections to users in the context of electronic services provided by the affiliate modules. The ad system 108 can include two modules: an ad selection module 110 and an ad serving module 112. The purpose of the ad selection module 110 is to make ad selections for presentation to the user. FIGS. 2 and 3, to be discussed below in turn, provide further information regarding the ad selection module 110. By way of overview, the ad selection module 110 uses plural content providers to generate plural sets of ad candidates, and then uses a chooser module to choose a set of ad candidates from the plural sets. A filtering module may further refine the chosen ad candidates into a set of ad selection for presentation to the user. The purpose of the ad serving module 112 is to deliver the ad units selected by the ad selection module 110 and to generally interact with the users. To perform its functions, the ad system 108 relies on the item management module 104 in the manner described below.

In terms of physical implementation, the various modules described above can be coupled together via any kind of communication mechanisms or combination of communication mechanisms. For instance, the user devices can interact with various remote modules via a wide area network, such as the Internet. For example, a user may use representative user device 106 to access representative affiliate module 102 and/or the item management module 104 via a network 114, such as the Internet. Other modules shown in FIG. 1 can interact using other kinds of communication mechanisms, such as a local area network. For example, internal components of the item management module 104 (described below) can communicate with each other via a local area network. In any case, the coupling mechanisms used in the environment 100 can include any combination of hardwired links, wireless links, routers, repeaters, gateways, name servers, and so forth (not shown), governed by any protocol or combination of protocols.

Various network-accessible modules shown in FIG. 1 can be implemented by server-type equipment and/or other electronic equipment. For instance, each affiliate module can be implemented by one or more server computers and storage devices maintained by respective third party owners. Likewise, the ad system 108 can be implemented by one or more server computers and storage devices. Likewise, the item management module 104 can be implemented by one or more server computers and storage devices. More generally, any of the modules illustrated in FIG. 1 can be located at a single site, or distributed over plural sites, and managed by a single entity or plural entities.

A.2. Item Management Module

This subsection provides additional information regarding the item management module 104. As explained above, in one case, the item management module 104 may correspond to any kind of entity for managing a plurality of items. In one case, these items may correspond to merchandisable items. The affiliate modules can present ad units which entice users to purchase items or perform some other action with respect to the items.

The item management module 104 can include various data stores 116. The data stores 116 provide information which is useful to the ad system 108 in selecting ad units for presentation to users. The data stores 116 may include an item catalog store 118 that maintains records of items managed by the item management module 104. These records can include item identifiers that uniquely identify the items, item descriptions, item-related commentary, and so forth. The data stores 116 may include a user data store 120 that maintains various information regarding users who interact with the item management module 104 and/or other types of users. Such user information may include any kind of information regarding the characteristics of the users, such as user ID information, age information, gender information, user interest information, residence information, and so on. The users may expressly supply the user information to the item management module 104, and/or the item management module 104 may obtain this information from other sources, and/or the item management module 104 can infer this information from actions taken by the users. The data stores 116 may also include a transaction data store 122. The transaction data store 122 can maintain a wealth of information regarding actions taken by the users. Such actions can include click events, shopping cart selections, item purchases, and so on. The transaction data store 122 can also store information that establishes the nexus of the users' behavior with the presentation of ad units (if, in fact, such nexus exists). Based on such transaction information, the transaction data store 122 can provide insight regarding the relative success or failure of ad units that are presented by the ad system 108. And as such, the information provided in the transaction data store 122 is also referred to below as "performance data."

Although each of the data stores 116 (e.g., data stores 118, 120, 122) is shown as a separate store, the item management module 104 can administer the information contained in one or more of these stores 116 in a single store. For instance, as represented by an arrow that points to a dashed-line box in user data store 120, the transaction information in the transaction data store 122 can be maintained on a per-user basis in the user data store 120. Alternatively, any of the data stores 116 can be implemented by plural component storage parts. Moreover, FIG. 1 shows that the data stores 116 are administered by the item management module 104. But in other implementations, other parts of the ad-serving environment 100 can administer the data stores 116. Generally, the data stores 116 can be maintained at a single location or can be distributed over plural locations.

Continuing with the description of the item management module 104, this module 104 can include an ad system interface module 124 for interacting with the ad system 108. The users may directly interact with the item management module 104 through other interfaces (not shown).

The item management module 104 can also include a transaction recording module 126. The purpose of the transaction recording module 126 is to record the behavior of users who interact with the item management module 104 and/or the affiliate modules. Such behavior may correspond to purchases or other acquisitions made by users, but can also include other selections, such as click events, shopping cart selections, wish list selections, and so on. Although not shown, other modules within the environment 100 can also perform a role in collecting transaction-related data.

The item management module 104 (or some other part of the ad-serving environment 100) can include an affiliate set-up module 128. The purpose of the affiliate set-up module 128 is to perform various set-up tasks that enable new candidate affiliate modules to join the ad-serving environment 100. The affiliate set-up module 128 also enables established affiliate modules to modify certain aspects of the ad-serving environment 100 (as it affects the affiliate modules).

For example, the affiliate set-up module 128 can allow any affiliate module to define settings which generally govern the way that ad units are presented to the user in the context of content delivered by the affiliate module. For example, the affiliate set-up module 128 can allow an affiliate module to make various selections that govern the amount of information that is conveyed by the ad units, the type of information that is conveyed by the ad units, the appearance and style of the ad units, the optional branding information that is presented in conjunction with the ad units, the behavior of the ad units, and so forth. For example, a particular affiliate module may make selections that specify that the ad units that it displays have a prescribed color and style, a prescribed branding logo, a prescribed behavior (e.g., popup behavior as opposed to some other kind of behavior), a prescribed amount of information concerning price, and so on. The affiliate set-up module 128 can also allow an affiliate module to select one or more keywords that will be used to trigger the presentation of the ad units. The set-up module 128 may receive any of the above-described selections via one or more configuration interface pages and/or other selection mechanisms.

The affiliate set-up module 128 can also analyze the characteristics of the particular affiliate module (including the typical behavior exhibited by its clientele), and based on this analysis, provide suggestions to the affiliate module regarding tools and other features that may make the affiliate module more effective in soliciting desired behavior from users. The affiliate set-up module 128 can also serve as a general interface for setting up and administering the revenue-sharing agreement between the item management module 104 and a particular affiliate module.

It will be appreciated that the item management module 104 may correspond to a relatively encompassing service that fulfills various other functions. Such functions are not directly germane to the serving of ad units by affiliate modules, and are thus not illustrated in FIG. 1.

A.3. Representative User Device

Turning now to the representative device 106, this device 106 represents any kind of electronic unit which can interact with server-side modules (e.g., the affiliate modules) via the network 114. In the most common case, the device 106 corresponds to a computer device, such as a personal computer, laptop computer, and so forth. But the device 106 may also correspond to a mobile telephone, a Personal Digital Assistant (PDA) device, a set-top box coupled to a television, a stylus-type input device, any kind of wearable computer, an electronic book-reader device, a personal media player, a game console device, and so forth. In any event, the device 106 can comprise (as main parts) a processing module 130, a presentation module 132, and an input module 134.

The processing module 130 generally corresponds to functionality (e.g., software logic, and/or circuitry, etc.) for processing information. As one component thereof, the processing module 130 can include a browser module 136 for interacting with various modules (such as the affiliate module 102) via the network 114. The browser module 136 can store one or more cookies 138. The cookies 138 record information regarding the user in known fashion, which can subsequently be accessed and used by network-accessible modules to identify the user. For instance, the item management module 104 can download a cookie affiliated with its services for storage at the user device 106. The affiliate modules can do the same.

The presentation module 132 generally corresponds to any mechanism or combination of mechanisms for presenting the processed information. For example, the presentation module 132 can present a graphical user interface 140 for interacting with the user. In the context of the present disclosure, the user interface 140 can display web pages and/or other content that are served by affiliate modules, such as affiliate module 102. FIG. 1 shows a representative web page 142. The web page 142 can include one or more ad slots that define space for presenting ad units to a user. For example, the web page 142 includes one ad slot 144 allocated for presenting an ad unit. Alternatively, or in addition, the presentation module 132 can also present ad units that have an audio component.

Finally, the input module 134 generally corresponds to any mechanism or combination of mechanisms for inputting data and instructions to the processing module 130.

A.4. Overview of the Ad Selection Module

FIG. 2 presents an overview of the ad selection module 110, which is used in the ad system 108. The purpose of the ad selection module 110 is to generate one or more ad selections for presentation to a user who is interacting with an electronic service offered by an affiliate module. The ad selections are presentable to the user in the form of ad units (to be described below).

By way of overview, the ad selection module 110 can present the ad selections upon the detection of an ad presentation opportunity. The ad presentation opportunity may be triggered by various events or combination of events, such as the user's activation of a particular web page provided by the associate component 102, the presentation of content containing predefined keywords, the user's selection of certain options, and so on. In response to the ad presentation opportunity, the ad system 108 may be asked to deliver one or more ad selections for presentation within a web page.

FIG. 2 illustrates one manner in which the ad selection module 110 can respond to an ad presentation opportunity. Assume that the user is interacting with a web page having main page content 202. This main page content 202 can convey any arbitrary information or service delivered by the affiliate component 102. The main page content 202 can include instructions that command the user device 106 to retrieve one or more ad selections generated by the ad system 108. For instance, the main page content 202 can include markup language instructions (e.g., HTML instructions) that direct the user device 106 to contact the ad system 108. In response, the ad system 108 can forward its ad selections to the user device for insertion within one or more ad slots in the web page. For instance, the web page shown in FIG. 2 includes two illustrative ad slots, namely, a first ad slot 204 and second ad slot 206. A first ad unit 208 is displayed in the first ad slot 204 and a second ad unit 210 is displayed in the second ad slot 206. Note that the user is thereby consuming content delivered from at least two sources. Namely, the user can receive the main page content 202 from the associate component 102 and the ad units (208, 210) from the ad system 108.

The ad selection module 110 itself can include a candidate generation module 212 and an optional filtering module 214. The purpose of the candidate generation module 212 is to generate a chosen set of one or more ad candidates in response to an ad presentation opportunity. More specifically, in one implementation, each ad slot (204, 206) represents a separate ad presentation opportunity. Thus, the candidate generation module 212 generates a first set of ad candidates for ad slot 204 and a second set of ad candidates for ad slot 206. More specifically, for each ad slot, the candidate generation module 212 generates the set of chosen ad candidates by choosing from plural sets of ad candidates generated by plural respective content providers (in the manner described below with respect to FIG. 3).

The purpose of the filtering module 214 is to further refine a chosen set of ad candidates into a set of one or more ad selections for presentation to the user in the ad slots (e.g., ad slots 204 and 206). The filtering module 214 can perform this task by making reference to at least one filtering criterion. Filtering criteria can be stored in a filtering criteria store 216. For example, the filtering module 214 can apply a filtering criterion that reduces the presence of ad selections that have a prescribed disfavored status (or alternatively, increases the presence of ad selections that have a prescribed favored status). For instance, the filtering module 214 can apply a filtering criterion that decreases (potentially eliminating) the presence of ad candidates that advertise merchandisable items that are unavailable for purchase by users. The filtering module 214 can additionally (or alternatively) apply a filtering criterion that reduces the presence of duplicate ad candidates in an ad unit, to the extent possible. Applied on a more global level, the filtering module 214 can reduce the possibility that a web page (which may include plural ad slots) will present the same ad selections. The filtering module 214 can additionally (or alternatively) apply a filtering criterion that reduces the presence of ad candidates that have prescribed impermissible content (or alternatively, increases the presence of ad selections that have prescribed permissible content). For example, the filtering module 214 can reduce the presence (potentially eliminating) ad candidates that have adult-related content, and so on. The filtering module 214 can additionally (or alternatively) apply a filtering criterion that facilitates achievement of a pre-determined earnings level of one or more of the plurality of affiliate components, resulting in dynamic revenue sharing. For example, the earnings of a particular affiliate component may be maximized to allow the particular affiliate component to reach a specified compensation tier. The filtering module 214 can apply yet other kinds of rules in decided how to cull a final set of ad selections from a proposed set of ad candidates.

The filtering module 214 can operate on a local level by applying filtering criteria to each ad opportunity. The filtering module 214 can also take into consideration the ad selections served in response to prior ad opportunities. For example, consider the case in which a filtering criterion provides a directive to reduce the presence of duplicate ad candidates in a first ad slot. The filtering module 214 can record its selections for this particular ad slot. When selecting ads for a second ad slot on the same page (if such a slot exists), the filtering module 214 can access its record of prior-served ad selections to reduce the possibility that ad selections provided for the second ad slot do not include the same ad selections as the first ad slot. The filtering module 214 also attempts to ensure that the new ad selections served for the second ad slot are not duplicative with respect to each other. The same procedure can be repeated for additional ad slots on a page. This mode of operation relies on the sequential processing of ad opportunities. In another case, the filtering module 214 can refrain from selecting ads for any one ad slot on a page until it provides global analysis of its selections for all ad slots on a page.

The filtering module 214 can also retain a history of ad selections that it serves over multiple web pages, and potentially over multiple user sessions. This further reduces the possibility that the ad selection module 110 is providing users with "stale" ad selections, meaning ad selections which do not exhibit a preferred degree of variation.

The filtering module 214 can be omitted. In this case, the candidate generation module's 212 set of chosen ad candidates also constitutes the final ad selections for delivery to the user.

Additional aspects of the FIG. 2 are set forth below, in the context of the explanation of FIG. 3.

A.5. Candidate Generation Component

FIG. 3 provides additional information regarding the candidate generation module 212 used in the ad selection module 110. Again, one purpose of the candidate generation module 212 is to generate a set of chosen ad candidates. In the manner described above, the filtering module 214 may further refine this set of ad candidates to produce a final set of ad selections for presentation to a user.

The generation component 212 generates the set of chosen ad candidates in response to an ad presentation opportunity. The ad presentation opportunity has a context. The context describes the setting, environment or circumstance in which the ad is presented. The context can have plural aspects, five of which are enumerated in the non-limiting and non-exhaustive list below:

Content-related aspect. A first aspect may pertain to one or more characteristics of the content-related setting in which the ad is presented. For instance, this aspect may correspond to textural information, symbolic information, and/or graphical information (or yet some other kind of information) that is being presented in the page 142. For example, suppose that the user activates a web page corresponding to hiking equipment. The content-related setting of the context may correspond to keywords that are found in the web page or keywords that can be derived from information provided in the web page, and so on. In more advanced cases, other content-related information can be extracted by considering positional arrangement of information on the page 142. For instance, content-related information can be extracted that identifies the nature of images and/or text which appears close to an ad slot 144 on the page 142.

Affiliate-related aspect. A second aspect of the context may pertain to one or more characteristics of the affiliate module 102 which provides the web page 142. Information regarding the affiliate module can be extracted based on various ID information associated with the affiliate module 102. The ID information can identify the affiliate module as a whole, e.g., corresponding to an entire website administered by the affiliate module. Or more granular ID information can be provided by identifying specific parts (e.g., pages) of a website administered by an affiliate module. In other cases, the affiliate-related information can identify relationships among different affiliate modules, e.g., under the assumption that the characteristics of one affiliate module may have a bearing on similar affiliate modules.

User-related aspect. A third aspect of the context may pertain to one or more characteristics of the user who is interacting with web page 142. In one case, the identity of the user can be extracted based on the cookie information 138 stored in the browser module 136. As stated above, the item management module 104 can supply this cookie, or some other module can provide the cookie. Other techniques besides cookie-based technology can be used to identify the user.

Location-related aspect. A fourth aspect of the context may pertain to one or more characteristics of the geographic location of a module affiliated with the transaction. This location information can be extracted from various ID and/or address information affiliated with the modules.

Temporal/seasonal-related aspect. A fifth aspect of the context may pertain to the time at which the ad presentation opportunity occurred. For example, timing information may indicate whether the opportunity occurred at a specific time of day, on a specific day of the week, on a specific holiday or other special event, during a specific season, and so forth. The timing information can be extracted from various sources, such as timestamp information associated with ad requests submitted to the ad system 108.

The ad selection module 110 uses different content providers to provide respective sets of ad candidates. FIG. 3 illustrates this feature by showing n content providers. Each of these content providers generates a set of ad candidates (where a set can include zero, one, or two or more ad candidates). For example, in response to an ad presentation opportunity, provider module 1 generates a first set of ad candidates for ad units to be presented on the web page 142, provider module 2 generates a second set of ad candidates, and so on. The ad selection module 110 can represent ad candidates using any type of information, such as codes which reference the ad candidates. For example, in those cases in which an ad candidate features a merchandisable item, the ad selection module 110 can represent this ad candidate in part by a unique code associated with the item.

Different content providers apply different respective paradigms in generating a set of ad candidates. A paradigm generally corresponds to rules and/or considerations that are used to identify the membership of the set.

A first class of content providers relies mainly on one aspect of the context in providing ad candidates. For example, the candidate generation module 212 can include one or more content providers that select ad candidates primarily based on the content-related aspect of the context. The candidate generation module 212 can include one or more other content providers that select ad candidates primarily based on the affiliate-related aspect of the context. The candidate generation module 212 can include one or more other content providers that select ad candidates primarily based on the user-related aspect of the context, and so on.

A content provider that operates based on the content-related aspect of the context selects a set of ad candidates that have some assessed nexus to the content being displayed in the web page 142 and/or the content entered via the web page 142 and/or some other content associated with the user experience. A content provider that operates based on the affiliate-related aspect of the context selects a set of ad candidates based on the characteristics of the affiliate module that is supplying content to the user (and/or based on the characteristics of a group of related affiliate modules). For example, such a content provider can identify a set of ad candidates that have historically performed well for an affiliate module. A content provider module that operates based on the user-related aspect of the context selects a set of ad candidates based on the characteristics of an identified user. For instance, such a content provider can identify a behavioral segment associated with the user and apply a set of ad candidates to the user that have traditionally performed well for that behavioral segment.

A second class of content providers provides ad candidates by relying on two or more predetermined aspects of the context. In this case, the content providers may use predefined rules in analyzing the two or more aspects of the context to generate ad candidates.

A third class of content providers provides ad candidates without relying on predetermined expectations regarding which aspect or aspects are more important than others. For example, a content provider in this class can use a model to map a multi-featured description of the ad presentation opportunity to a set of ad candidates. The model can be generated by analyzing the past performance of the content provider for different ad presentation opportunities. The model-generating process need not expressly articulate, a priori, what aspects of the ad presentation opportunity it is relying on. Rather, this relationship emerges from the historical performance data. Moreover, insofar as the model is based on historical performance data, the model can change over time in its relative reliance on different aspects of the context.

A fourth class of content providers can provide ad candidates in a relatively context-independent manner. For example, a content provider in this class can generate ad candidates for top-selling items (from the perspective of the item management module 104), without any consideration of whether these items are appropriate for a particular page being presented, affiliate identity, and/or user identity.

Still other genres of content providers may be used. The above list of classes is representative, rather than exhaustive of the possibilities.

Figure 4:
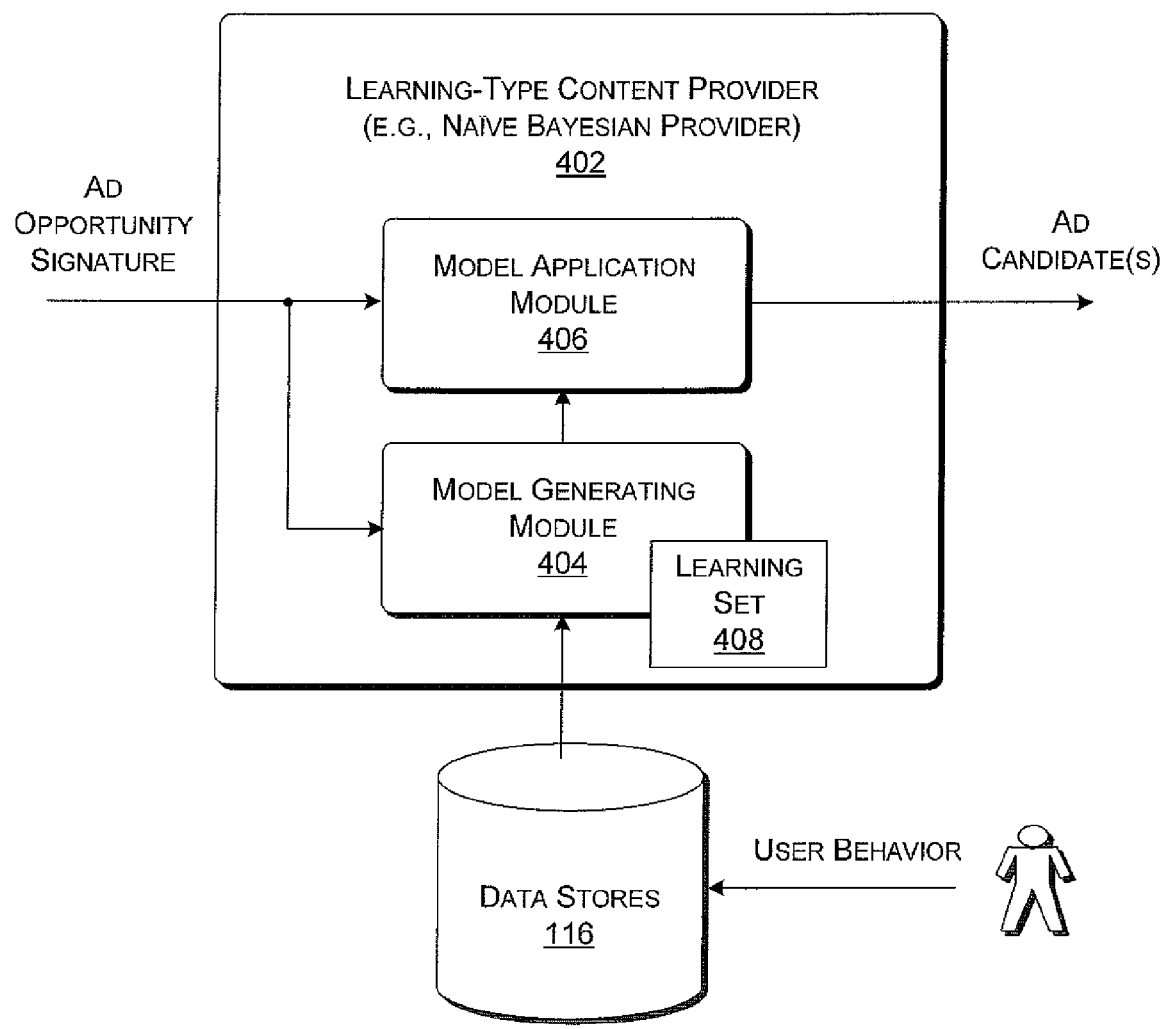
FIG. 4 shows a Bayesian-type content provider that can be used in the candidate generation module of FIG. 3.
Figure 5:
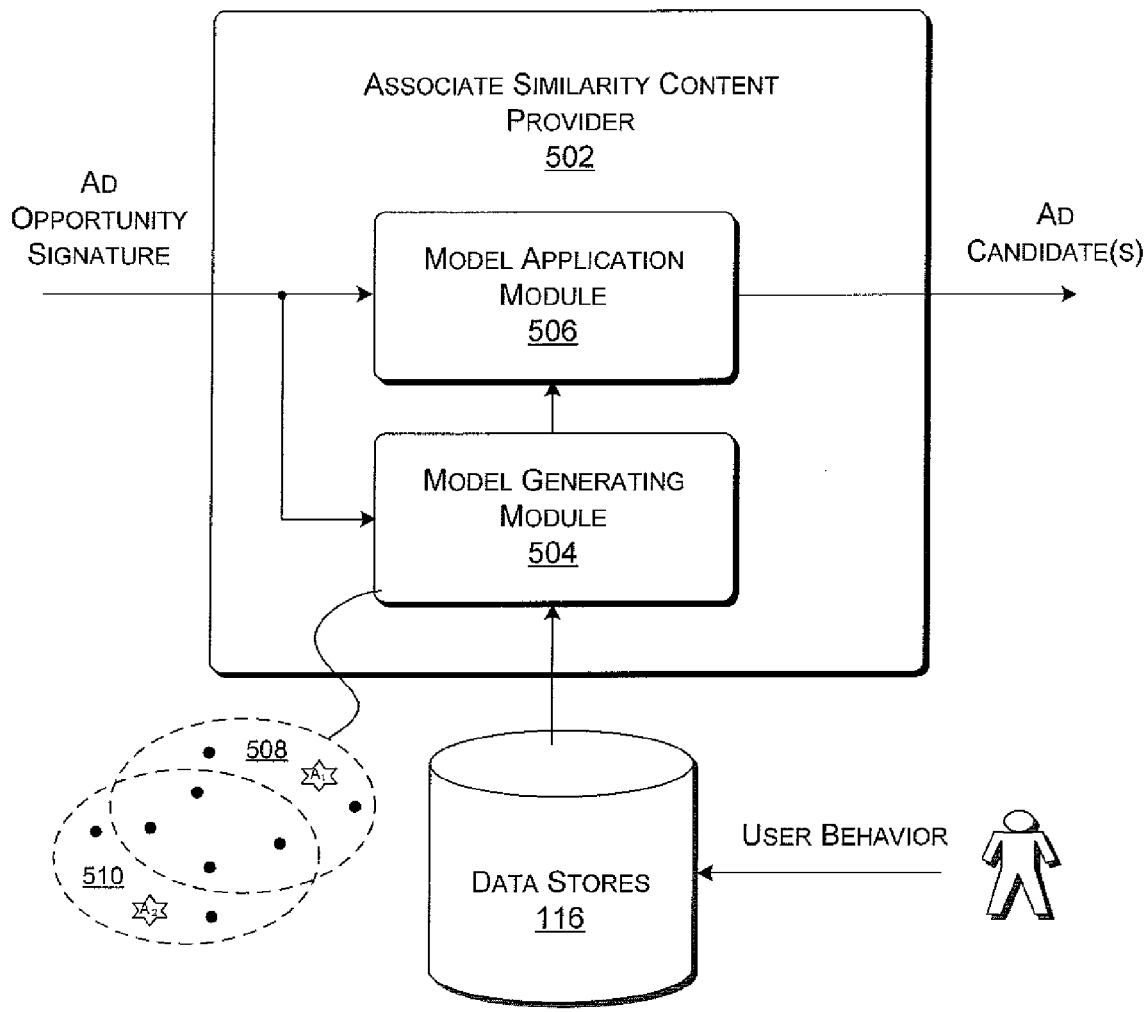
FIG. 5 shows an affiliate similarity content provider that can be used in the candidate generation module of FIG. 3.
Figure 6:
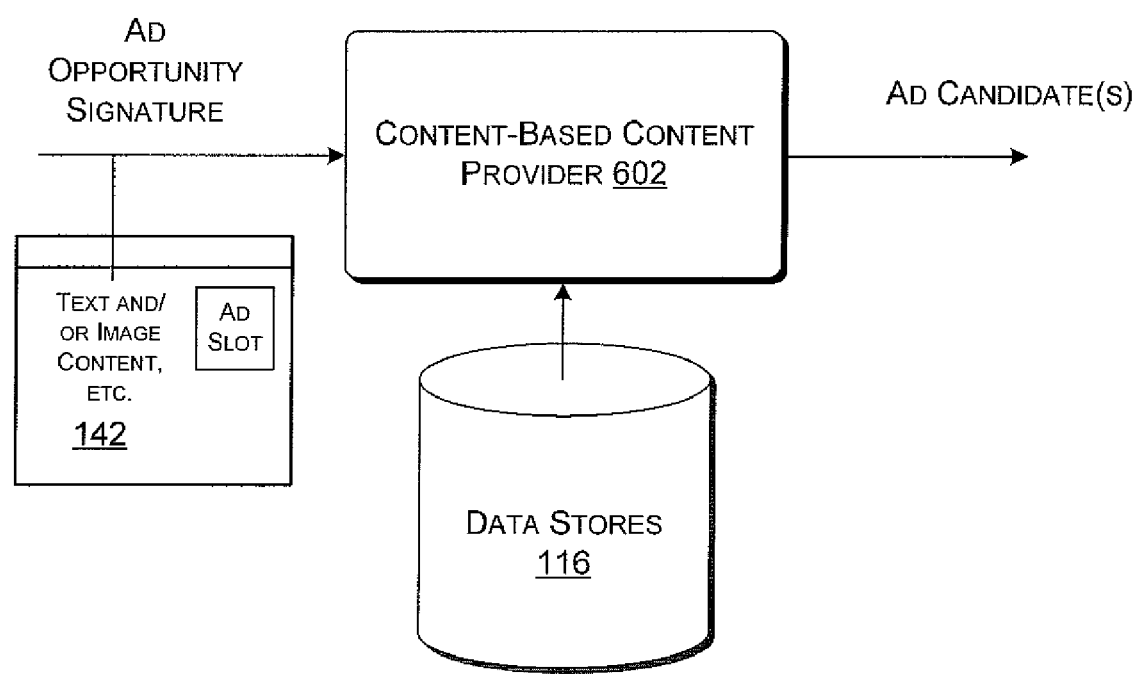
FIG. 6 shows a content-based content provider that can be used in the candidate generation module of FIG. 3.
Figure 7:
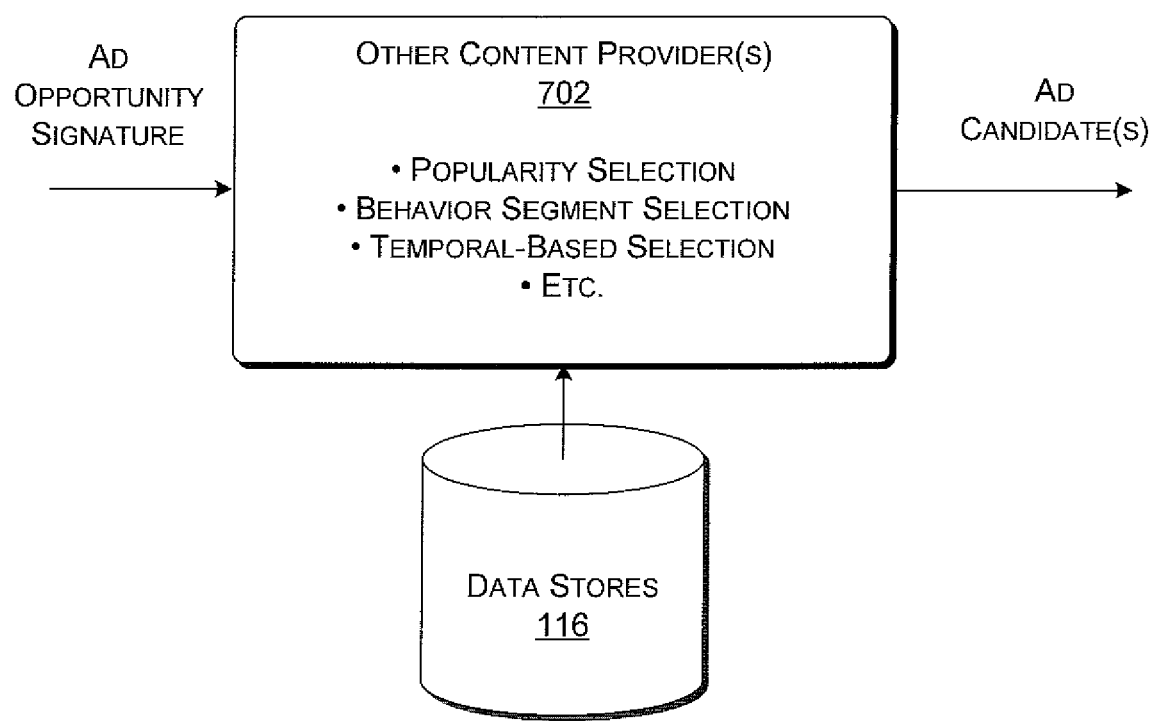
FIG. 7 generally shows other content providers that can be used in the candidate generation module of FIG. 3.

FIGS. 4-7 (to be discussed below) provide additional information regarding different types of content providers. For example, FIG. 4 describes a content provider that uses a Naïve Bayesian model to generate ad candidates. The Naïve Bayesian model can correspond to the above-described third class of providers which relies on different aspects of the context in an open-ended and flexible manner. FIG. 5 describes an affiliate similarity content provider. The affiliate similarity content provider relies primarily on the affiliate-related aspect of the context. FIG. 6 describes a content-based content provider. As the name suggests, the content-based content provider relies primarily on the content-related aspect of the context. FIG. 7 generally shows other types of content providers (to be described in greater detail below).

By way of overview here, each content provider can accept an opportunity signature. An opportunity signature is a collection of data that provides salient information regarding the ad presentation opportunity, such as various web page keywords, user ID information, affiliate ID information, an IP address of the web page 142, geographic location information, timestamp information, and so on. Other attributes of the signature may represent secondary information that can be derived from originally-supplied information regarding the ad presentation opportunity. For example, the ad system 108 can apply user ID information to retrieve additional information that may be recorded in the data stores 116 regarding the user.

Generally, different parts of the ad opportunity signature may correspond to different aspects of the context. For instance, the keyword-related part pertains to the content-related aspect of the context. The affiliate ID part pertains to the affiliate-related aspect of the context. The user ID part pertains to the user-related aspect of the context, and so on. Other parts of the ad opportunity signature may correspond to plural different aspects, while other parts may not correspond to any aspect of the context.

Each content provider receives the opportunity signature as input, and, in response, maps the signature into a set of ad candidates using different respective paradigms (as summarized above). As mentioned, some of the paradigms may rely on predefined aspects of the context, while other paradigms may take a more open-ended approach in relying on different aspects of the context. In generating their ad candidates, the content providers may rely on different data stored in the data stores 116, including item catalog data from item catalogue store 118, user characteristic data from the user data store 120, and transaction data (e.g., performance data) from the transaction data store 122.

The candidate generation module 212 further includes a chooser module 302. The purpose of the chooser module 302 is to select, from among the ad candidates generated by the content providers, a set of ad candidates (referred to as a "chosen set of ad candidates"). In general terms, the chooser module 302 may weight the ad candidates generated by the content providers so that some content providers are favored over others.

The output of the chooser module 302 is a set of ad candidates that is selected to achieve a desired aim or plural aims. For example, the chooser module 302 can generally select the ad candidates deemed most likely to elicit user action (e.g., clicks, purchases, etc.) or achieve some other aim. The chooser module 302 can generally select ad candidates that complement the multi-faceted nature of the context of the ad presentation opportunity. However, the chooser module 302 may not select the most relevant ad candidates in all circumstances. For example, in some circumstances, the chooser module 302 may wish to favor experimental candidates that have not yet proved their effectiveness; the chooser module 302 may adopt this strategy to prevent ad candidates with well-proven effectiveness from precluding the introduction of potentially new promising candidates. Subsection A.7 (below) provides additional details regarding one illustrative implementation of the chooser module 302.

As another feature of the candidate generation module 212, learning functionality can be provided. This learning functionality receives information regarding the performance of the ad selection module 110 and adjusts the behavior of the candidate generation module 212 based on this performance. For example, one or more of the content providers can use models that are dynamically modified based on the performance of the ad selection module 110. Further, the chooser module 302 can dynamically modify its operation based on the performance of the ad selection module 110.

For example, suppose that the chooser module 302 initially selects ad candidates which emphasize the content-related aspect of the context. According to one implementation, the ad candidates may be deemed successful based on their performance, namely, depending on whether the ad candidates elicit desired user action. The learning functionality receives this performance data and changes the behavior of the chooser module 302 based on this information. For example, if the content-related content providers are performing poorly, the chooser module 302 can adjust the weights applied to the content providers to henceforth disfavor the content-related provider modules (relative to other content providers).

Further details of the candidate generation component 212 can be best understood by first revisiting certain aspects of the web page shown in FIG. 2. As shown there, an ad unit can include one or more parts, including one or more featured item parts and a creative part. A featured item part identifies a substantive message conveyed by the ad unit. For example, a featured item part may correspond to a merchandisable item offered by the item management module 104. A creative part governs a manner in which the featured item part is conveyed to a user. For example, the creative part may govern the visual appearance of an ad unit, the number of featured item parts contained within the ad unit, the functional properties of the ad unit, and so forth.

Consider, for example, ad unit 208. This ad unit 208 includes a creative part that accommodates the display of two featured item parts (e.g., featured item part 218 and featured item part 220). Ad unit 210, on the other hand, includes a creative part that accommodates the display of only one featured item part 222. Further, the creative part for ad unit 208 displays its featured items parts in a different manner than the creative part for ad unit 210. For example, the creative part for the ad unit 208 can display relatively small static pictures of merchandisable items, while the creative part for the ad unit 210 can include a larger animated picture of its item. The creative part for the ad unit 208 also includes different user controls compared to the creative part of ad unit 210. The controls determine how the user is allowed to interact with the ad units. FIG. 2 generally represents the creative part for the ad unit 210 as a framework 224. The featured item part 222 is "plugged into" this framework 224 to provide the ad unit 210.

Returning to FIG. 3, the candidate generation component 212 can generate ad candidates using various approaches. The approaches may vary in the way they handle the multi-part composition of ad units. Generally, note that the term "ad candidate" is used herein in a generic manner to refer to any aspect of ad information. In one case, an ad candidate refers to an integrated creative part and one or more featured items parts. In another case, an ad candidate refers to either a creative part or a featured item part (or some other part of an ad unit).

In a first implementation, a content provider can produce ad candidates that include integrated creative parts and feature items parts. That is, such a content provider can generate a first ad candidate which includes an integrated creative part and one or more feature items parts, a second ad candidate which includes an integrated creative part and one or more feature item parts, and so on. In other words, the ad candidates in this case correspond to complete ad units.

In a second implementation, a content provider can produce ad candidates in the form of separate creative parts and featured item parts. That is, such a content provider can generate ad candidates in the form of one or more creative parts and one or more featured item parts, where these parts are not integrated together at this time. This means that the chooser module 302 may receive plural candidate creative parts from one or more content providers. To repeat, creative parts may differ in various respects. For instance, the creative part for the ad unit 208 accommodates the presentation of plural featured item parts, while the creative part for ad unit 210 accommodates the presentation of only one featured item part.

In the second implementation described above, the chooser module 302 makes two choices. First, the chooser module 302 decides what creative part among plural possible candidate creative parts will be used for an ad unit under consideration. (Alternatively, the chooser module 302 can optionally select plural candidate creative parts at this stage.) Second, the chooser module 302 decides what featured item parts will be used to "fill in" the slots of the chosen creative part. The first decision has an impact on the second decision. This is because certain featured item parts may be more appropriate for certain types of creative parts but not others. Further, the selected creative part may influence the chooser module's 302 decision regarding how many featured item parts it should provide. In another implementation, the chooser module 302 can select featured item parts first, and then select a creative part.

The chooser module 302 can apply various rules and considerations in selecting one or more creative parts from plural candidate creative parts. For instance, the chooser module 302 can decide that an ad unit that displays plural featured item parts is more effective for affiliate module A compared to affiliate module B. This decision can be based on past performance data maintained in the item management module 104. The past performance data reflects the relative success of different types of creative parts for different affiliate modules. In general, the chooser module 302 can select creative parts based on any attribute or combination of attributes expressed in an ad opportunity signature, and/or based on any other factor or combination of factors. For example, other attributes that can be used to select a creative part can pertain to the content-related context of the opportunity, the user-related context of the opportunity, and so forth. In an alternative implementation, one or more of the choosing operations performed by the chooser module 302 (described above) can be delegated to the filtering module 214 or some other module.

In summary, the candidate generation module 212 can assemble various parts of an ad unit based on a host of rules and considerations. To facilitate explanation, however, the following explanation resumes it generic reference to the output of each content providers as one or more "ad candidates," with the understanding that any ad candidate can include an integrated creative part with one or more featured item parts, or a separate creative part, or a separate feature item part, and so on.

A.6. Illustrative Content Providers

This subsection provides additional information regarding a group of content providers that can be used in the candidate generation module 212. The content providers described herein are enumerated by way of illustration, not limitation. Other candidate generation modules 212 can incorporate additional types of content providers and/or can omit one or more of the content providers described below.

Further, any of the content providers can be used in environments other than the multi-provider environment 100 shown in FIG. 1. For instance, any of the content providers can be used as a stand-alone content provider. That is, any of the content providers can generate ad selections in other environments that do not use a multi-provider framework.

A.6(a). Content Provider Using Machine Learning Functionality (such as Bayesian-Type Machine Learning Functionality)

FIG. 4 shows one content provider 402 for use in the candidate generation module 212. This content provider 402 uses any kind of machine learning functionality. Generally, machine learning functionality allows the content provider 402 to provide appropriate ad selections based on a body of prior performance data. In other words, the machine learning functionality allows the content provider 402 to modify its ad selection behavior based on how the content provider 402 has performed in the past (relative to one or more desired aims, such as eliciting desired user behavior).

The content provider 402 includes a model generating module 404 and a model application module 406. By way of overview, the model generating module 404 generates in offline fashion a model based in part on past performance data extracted from the data stores 116. The performance data identifies the extent to which ad selections generated in response to various ad opportunity signatures have been successful in eliciting desired user behavior (e.g., click events, sales, etc.). Generally stated, the goal of the model generating module 404 is to produce a model which maps (e.g., relates) ad opportunity signatures to effective ad selections based on patterns and trends exhibited in the performance data. The model application module 406 uses the model generated by the model generating module 404 to map new opportunity signatures into a set of ad selections that are likely to prompt desired user behavior. In general, the content provider 402 may represent an example of the above-described third class of content providers that rely on different aspects of the context information, but which do so in a dynamic manner that can be expected to change with the evolving nature of the performance data maintained in the data stores 116.

The learning-type content provider 402 can rely on different types (or combinations) of machine learning functionality that perform classification. Generally, such machine learning functionality can predict the class of an object based on its features (e.g., attributes). For instance, the machine learning functionality can apply any one of or combination of the following non-limiting list of techniques: neural network techniques; K-nearest neighbor techniques; decision tree techniques; genetic algorithm techniques; quadratic classifier techniques, and so on.

The machine learning functionality can rely on probability-based techniques. For instance, in one illustrative case, the content provider 402 can be implemented using a Bayesian classification technique. More specifically, in view of the complexity of the ad selection problem (e.g., there are many different affiliate modules and many different possible ad selections that can be made), the learning-type content provider 402 can make various simplifying assumptions. For instance, the learning-type content provider 402 can rely on a "Naïve" version of Bayes' theorem. The Naïve Bayes's theorem in general is described in various sources, such as Lewis, "Naïve (Bayes) at Forty: The Independence Assumption in Information Retrieval," Lecture Notes in Computer Science, Vol. 1398, Proceedings of the 10th European Conference on Machine Learning, pp. 4-15.

Generally, the Naïve Bayes theory is based on the assumption that the features of objects are statistically independent. That is, if the features are $F_1, \ldots F_n$, then for any two features $F_i$ and $F_j$ from this set, the following equation applies:

$$Pr[F_i|F_j] = Pr[F_i]Pr[F_i|F_j] = Pr[F_i] \quad (1).$$

The independence assumption may generally apply in many circumstances. And even it does not strictly hold true, the Naïve Bayes theory can often be applied to provide reliable classification results.

Using equation (1), the decision rule for a Naïve Bayes classification algorithm can be expressed as:

$$\arg\max_{c \in C} Pr[C=c] \prod_{i=1}^{n} Pr[F_i = f_i | C = c]. \quad (2)$$

In this equation, C refers to a set of potential classes c for an object having feature values $f_1 \ldots f_n$ for the features $F_1 \ldots F_n$. The classification algorithm is trained using data regarding a set of objects having known features and classes. The training operation involves counting occurrences of various events that have a bearing on the classification of objects. The training operation produces estimates for the quantities used in equation (2).

When applied to the content provider 402 of FIG. 4, the Naïve Bayes classification algorithm chooses ad candidates for inclusion in one or more ad units. The model application module 406 performs this task by ranking the ad candidates using equation (2). In this application, the ad selections can be regarded as objects. The attributes of the ad opportunity signature can be considered as features. The ad candidates that have yielded desired results for different ad presentation opportunities can be considered as classes (where the ad candidates may correspond to different respective featured item parts associated with respective merchandisable items).

The model generating module 404 can estimate the quantities in equation (2) based on performance data. The performance data identifies ad selections that have resulted in positive interactions with users. Positive interactions may reflect various events, such as a user clicking on an ad unit, a user purchasing an item in response to an ad unit, a user hovering over an ad unit with his or her mouse device, and so forth.

The above-described approach may work well in various circumstances in terms of achieving positive interaction with the users. For example, the approach may work well in the case in which the ad selections are included in ad units with a reasonably flat probability distribution. The approach may also work well in the case in which ad selections that have good performance are already preferred by the candidate generation module 212. In other cases, however, it may be desirable to account for the number of times an ad selection was shown and did not result in positive interaction with a user. One algorithm for ranking ad selections that takes account for this additional information is:

$$Pr[\text{click}=\text{true}|A=a, F=f] \quad (3)$$

In this equation, click is a variable indicating whether or not some desired interaction occurred in an ad unit having component space A filled with component a, offered in an advertising opportunity having features values f for features F.

Using the Naïve Bayes assumption given in equation (1), it is possible to obtain an estimate for equation (3) via algebraic manipulation of equation (2), as follows:

$$Pr[\text{click} = \text{true} | A]^{1-n} \prod_{i=1}^{n} Pr[\text{click} = \text{true} | A, F_i]. \quad (4)$$

The model generating module 404 can estimate the quantities in equation (4) based on performance data, as formulated in a learning set 408. This learning set 408 can be expressed as a table. The table may include: one line for each ad presentation opportunity/ad selection pair; one column for each feature of the ad presentation opportunity; one column for each ad selection used in the ad unit; and one column that indicates whether or not a positive interaction was detected involving a user and the ad selection module 110. More specifically, the model generating module 404 can estimate the values in equation (4) based on the learning set 408 by counting relevant performance events, as indicated in equation (5):

$$\hat{Pr}[\text{click} = \text{true}, A = a] = \frac{\text{Count}[\text{click} = \text{true and } A = a]}{\text{Count}[*]}. \quad (5)$$

In this equation, Count[click=true and A=a] refers to the number of rows in which the click column contains the value true and the A column contains the value a. Count[*] refers to the number of rows in the table. Further, a prior estimate of values in equation (4) can be mixed based on a technique described in T. Mitchell, *Machine Learning*, McGraw-Hill, 1997. That is, estimating the probability of an event X may be conditioned with a prior estimate of the probability of X, $p_x$ as expressed as follows:

$$\hat{Pr}[X] = \frac{C[X] + kp_x}{C[*] + k}. \quad (6)$$

In this equation, k is a parameter chosen to control an amount of influence that the prior has on the estimate. The hat over the Pr[X] denotes that Pr[X] is an estimate rather than an actual probability measure. This method of mixing can be thought of as adding k phantom rows to the dataset conforming in their probability distribution to the prior.

To repeat, the Naïve Bayes content provider 402 is just one type of learning-type content provider. Other types of learning-type content providers can rely on different models, such as a neural network model, etc.

A.6(b). Affiliate Similarity Content Provider

FIG. 5 shows an implementation of an affiliate similarity content provider 502. This content provider 502 includes a basic framework that is similar to that shown in FIG. 4. Namely, the content provider 502 includes a model generating component 504 for generating a model. The model generating module 504 can generate this model in offline fashion based on historical performance data maintained in the data stores 116. The model maps prior ad opportunity signatures to successful ad candidates based on the performance data. The content provider 502 also includes a model application module 506 for applying the model created by the model generating module 504 to map new ad opportunity signatures to ad candidates that are selected to achieve a desired aim or aims.

The model generating module 504 generates a model which leverages similarity among different affiliate modules in generating ad candidates. That is, the model generating module 504 identifies clusters of affiliate modules that have similar ad selection behavior. The model generating module 504 can then identify a collection of ad selections which are appropriate for each group of affiliate modules. For example, the model generating module 504 can use prior transaction data in the data stores 116 to determine that a set of ad selections $S_1$ 508 has been successful in soliciting desired user action via a first affiliate module $A_1$, a set of ad selections $S_2$ 510 has been successful in soliciting desired user action via a second affiliate module $A_2$, and so on. The ad selections may correspond to different featured item parts, which, in turn, may correspond to different respective merchandisable items. Affiliate modules $A_1$ and $A_2$ (among other affiliate modules, not shown) may be considered as belonging to the same group because they share many of the same ad selections. If such a relationship exists, the model generating module 504 can identify a collection of ad selections which are appropriate for any member of the group, which, in one case, may comprise a union of at least the ad selection sets $S_1$ and $S_2$.

In the real-time operation of the content provider 502, the model application module 506 can rely on the model to map a new ad opportunity signature to one or more ad candidates. For instance, assume that the ad opportunity signature identifies that the user is interacting with affiliate module $A_1$. The model application module 506 can identify a set of ad candidates that are taken from a collection of ad candidates appropriate to affiliate module $A_1$'s group of affiliate modules (e.g., taken from a group that includes at least the union of sets $S_1$ and $S_2$).

The general principle underlying the operation of this content provider 502 is that, if two or more affiliate modules have similar characteristics, then the ad candidates generated for one affiliate module may be also applicable to another affiliate module in the group. In general, the affiliate similarity content provider 502 is an example of a content provider that relies primarily on the affiliate-related aspects of the ad presentation context. For example, the ad presentation context may include text adjacent to an ad space designated for presentation of an ad. Adjacent text, as used in determining the context, is text that is physically nearby the ad space on the web page during presentation of the web page. In one example, adjacent text includes that which abuts or is immediately proximate to the ad space. This may be especially useful on pages with a variety of content, for example discussion forums.

More formally stated, in order to assess similarity among affiliate modules, the model generating module 504 can consider the number of clicks on a particular pairing of affiliate ID and an ad selection identifier as a measure of a degree of association between the affiliate ID and ad selection identifier (where the ad selection identifier may correspond to the selection of a merchandisable item). The model generating module 504 can set up a matrix M in which rows correspond to affiliate IDs and columns correspond to ad selection identifiers. Each entry in the matrix contains a value that is equal to the number of clicks corresponding to a pairing of affiliate ID and ad selection identifier. In other words, each value in M represents a degree of association between an affiliate ID and an ad selection identifier. This causes rows corresponding to affiliate IDs with many clicks to have a larger magnitude. To address this situation, the model generating module 504 can treat all the values in a row as a vector and convert this vector into a unit vector by normalizing the row.

The model generating module 504 next computes a matrix $MM^T$, which gives a degree of association between the different affiliate IDs. The model generating module 504 then computes a matrix $R=MM^TM$, which contains new values of association between each affiliate ID and ad selection identifier. These values can be used to rank item identifiers for a particular affiliate ID.

A.6(c). Content-Based Content Provider

FIG. 6 shows an implementation of a content-based content provider 602. This content provider 602 analyzes information presented in the web page 142 to determine what ad candidates to offer a user. As the name suggests, the content-based content provider 602 is an example of a provider that relies primarily on the content-related aspects of the ad presentation context.

In one exemplary implementation, the content-based provider 602 operates by first scanning the web page 142 to recognize its layout. Based on the layout, the content-based provider 602 assigns a template to the page 142. This template defines what portions of the page 142 contain relevant content for ad targeting. After assigning a template, the content-based provider 602 performs text mining on the relevant page content, and generates a set of keywords and concepts that describe the web page 142. That is, the content-based provider 602 generates the keywords and concepts that it determines are most likely to result in successful ad candidates. However, these keywords and concepts may not necessarily actually appear in the content of the web page 142. Alternatively, one or more aspects of the above-described keyword extraction procedure can be delegated to a signature-forming module (not shown) which generates the ad opportunity signature. In other words, the signature-forming module can extract the keywords in the manner described above and pass the keywords to the content-based content provider 602.

At this point, the content provider 602 uses the determined keywords and concepts to select featured item parts to be presented in the ad candidates. This mapping operation can be based on predetermined rules and/or empirical correlations of keywords and concepts to featured item parts. Although not shown, this content provider 602 can collect performance data which reflects the success of the ad candidates in eliciting clicks, purchases, etc., and uses this performance data to improve the accuracy of its ad recommendation operations.

A.6(d). Miscellaneous Other Content Providers

FIG. 7 generally represents any other type of content provider 702 that can be used in the ad selection module 110. One such other type of content provider 702 generates ad candidates corresponding to (or similar to) the top-selling and/or quickest-selling items for a particular affiliate module. Another type of content provider generates ad candidates based on a behavioral segment to which a user belongs. A behavioral type of content provider is an example of a content provider that primarily relies of the user-related aspect of context. Another type of content provider generates ad candidates based primarily on temporal considerations. For example, this type of content provider can favor certain types of ad candidates in certain seasons.

A.7. Illustrative Chooser Module

Figure 8:
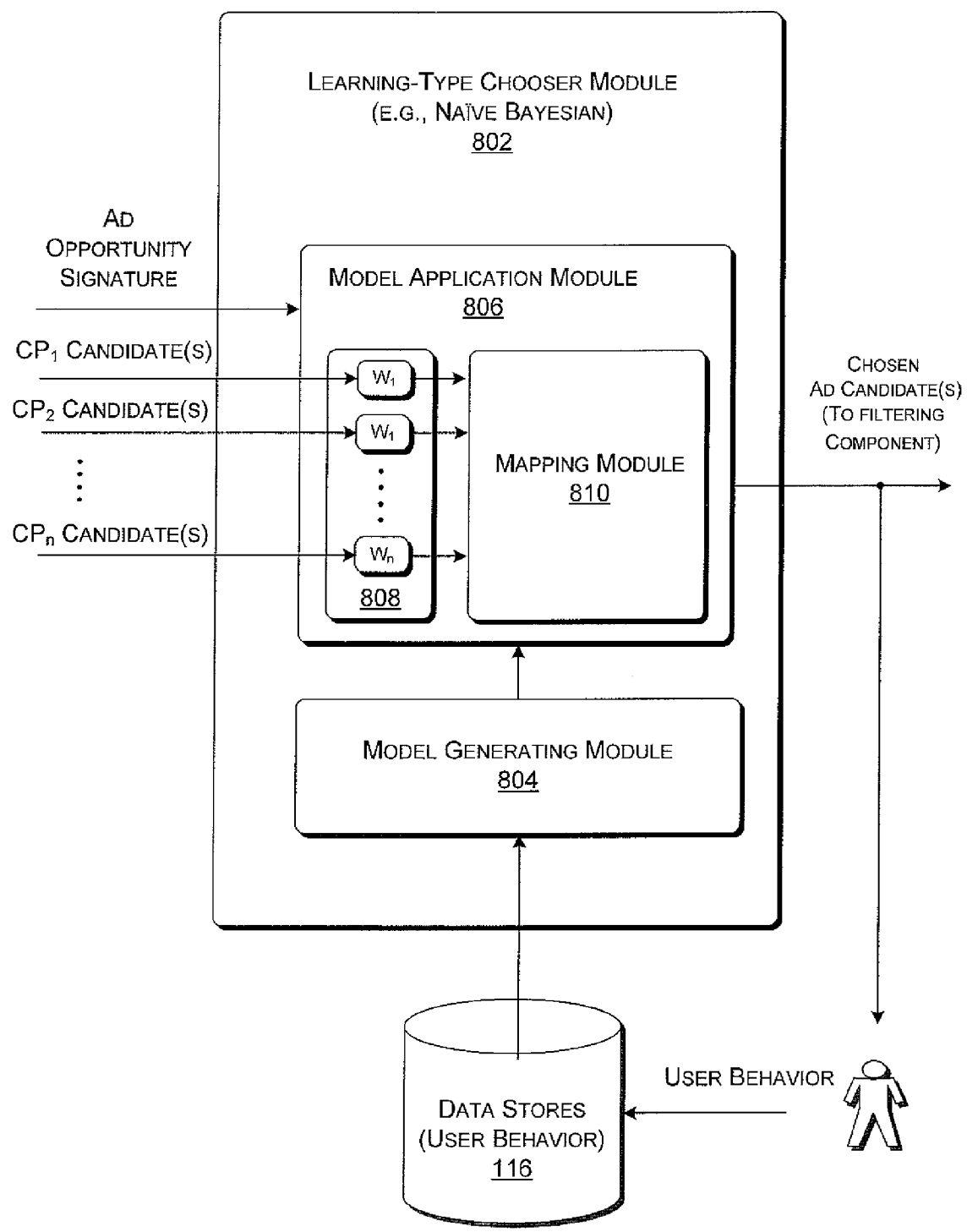
FIG. 8 shows an exemplary implementation of a chooser module that can be used in the candidate generation module of FIG. 3.

FIG. 8 shows one illustrative implementation of a chooser module 802. The role of the chooser module 802 is to choose a set of ad candidates from multiple sets of ad candidates generated by the content providers, thereby providing a chosen set of ad candidates. In one implementation, the chooser module 802 can forward its set of chosen ad candidates to a filtering module 214 (shown in FIG. 2). The filtering module 214 can further refine this set to produce a set of final ad selections.

The illustrative chooser module 802 of FIG. 8 is a learning-type chooser module, meaning a chooser module that relies on machine learning functionality to perform its role. Generally, the learning-type chooser module 802 includes a model generating module 804. This model generating module 804 samples performance data stored in the data stores 116 to generate a model. The model generating module 804 performs this task by examining the manner in which ad presentation opportunities (associated with respective ad opportunity signatures) have been related to successful ad selections.

The learning-type chooser module 802 also includes a model application model 806. The purpose of the model application model 806 is to apply the model generated by the model generating module 804 to map new signatures to weighting information. The weighting information defines the relative weights applied to the content providers, which, in turn, determines the manner in which certain content providers are favored or disfavored relative to other content providers. More specifically, in one case, each content provider can assign a numerical value which reflects the relative rank of its ad candidates. By multiplying these numerical values by weighting information, the model generating module 804 can effectively modify the rank of certain ad candidates relative to other ad candidates.

More specifically, the model application module 806 can include a weighting module 808 that applies weights to the respective content providers. In one case, the weighting module 808 can apply weights that are calculated periodically, but do not vary on a per-signature basis for every ad presentation opportunity. In another case, the weighting module 808 can calculate weights that are fully dynamic, meaning that these weights do vary on a per-signature basis for every ad presentation opportunity.

The model application module 806 also includes a mapping module 810 that selects the set chosen ad candidates based on the weights applied by the weighting module 808. Consider, for example, the illustrative case in which a first content provider generates a first set of ranked ad candidates, which are weighted by weighting factor $w_1$. A second content provider generates a second set of ranked ad candidates, which are weighted by a weighting factor $w_2$, where $w_1 > w_2$. The mapping module 810 may draw primarily from the first set of ad candidates in generating the set of ad candidates (since $w_1 > w_2$), but the mapping module 810 can also draw from the second set of ad candidates in selecting ad candidates to include in the set of chosen ad candidates (because some of the higher ranked ad candidates in the second set may have a higher weighted rank than some of the lower ranked ad candidates in the first set).

The model generating module 804 can use any machine learning technique to generate its model, such as, but not limited to, the above-described Naïve Bayes's approach. In this case, the model generating module 804 generates a Bayesian model which maps an opportunity signature to an indication of which content provider (or providers) is most likely to do the best job in generating ad candidates.

A.8. Illustrative Processing Functionality

Figure 9:
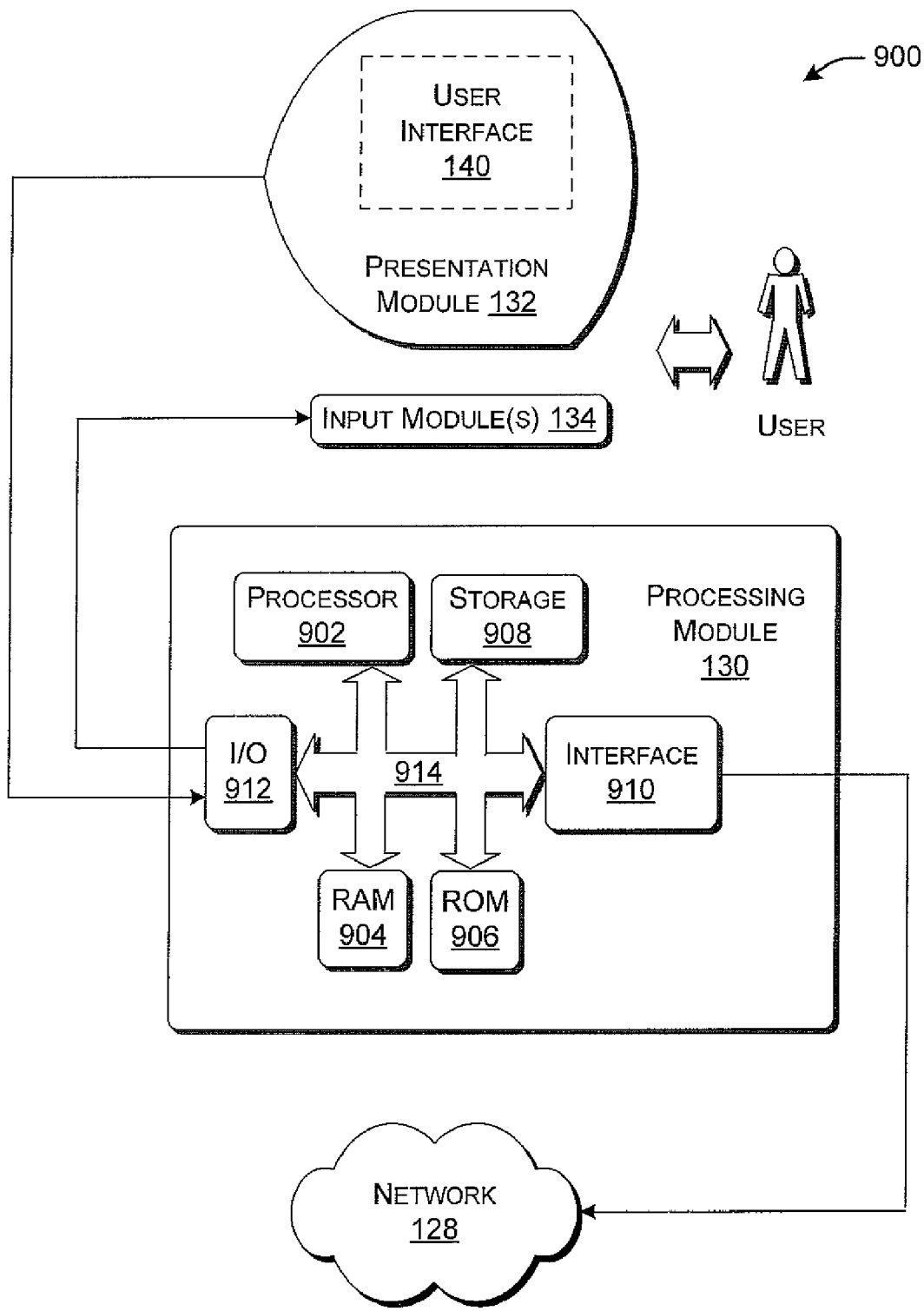
FIG. 9 shows illustrative processing functionality for implementing any aspect of the system shown in FIG. 1.

FIG. 9 shows illustrative processing functionality 900 that can be used to implement any feature of the ad-serving environment 100 shown in FIG. 1, such as the user device 106, the ad system 108, any affiliate module, any aspect of the item management module 104, and so forth. The processing functionality 900 can represent, without limitation, any one or more of a personal computer; a laptop computer; a server-type computer; a book-reader type device; a portable media player device; a personal digital assistant (PDA) device; a mobile telephone device; a tablet-type input device; any kind of wearable device; a game console device; a set-top box device, and so on. To facilitate discussion, the processing functionality 900 is described below as specifically implementing the representative user device 106, although the generic processing functionality 900 also sets forth an architecture of a server-type computer that can be used to implement any server-side module of the environment 100.

In this local device context, the processing module 130 can comprise one or more processing units 902 (such as a CPU, etc.), RAM 904, ROM 906, media modules 908 (such as a hard drive, DVD drive, etc.), network interface 910 (such as a telephone or cable modem, broadband connectivity mechanism, etc.), and an I/O interface 912 for interacting with input devices and output devices. One or more buses 914 couple the above-described modules together.

The output device(s) can include the presentation module 132, which presents the graphical user interface 140. The input module(s) 134 can include any one or more of a keyboard, mouse input device, track ball input device, joystick input device, touch sensitive screen, and so forth.

In any application of the processing functionality 900, various functions can be implemented as machine-readable instructions that reside in any storage unit or combination of storage units shown in FIG. 9, and the processor unit 902 can execute these instructions to produce desired operations.

B. Illustrative Procedures

FIGS. 10-15 describe the operation of the ad-serving environment 100 of FIG. 1 in flow chart form. To facilitate discussion, certain operations are described as constituting distinct blocks performed in a certain order. Such implementations are illustrative and non-limiting. Certain blocks described herein can be grouped together and performed in a single operation, and certain blocks can be performed in an order that differs from the order employed in the examples set forth in this disclosure. The blocks shown in the flowcharts can be implemented by software, firmware, hardware, manual processing, or by a combination of these elements.

As the functions described in the flowcharts have already been set forth in detail in Section A, Section B serves primarily as a review of those functions.

B.1. Behavior from the Perspective of a User

Figure 10:
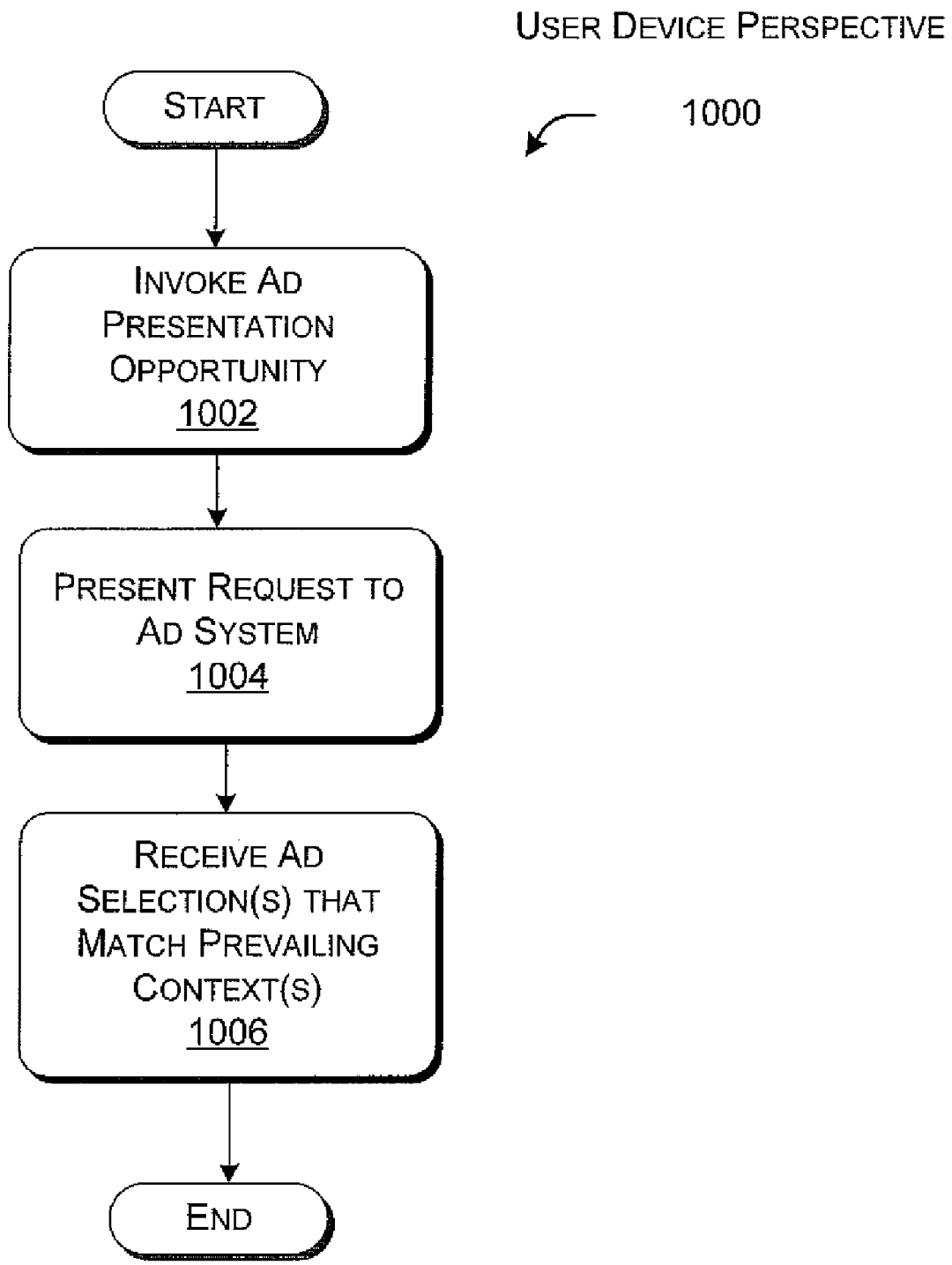
FIG. 10 shows, from a user perspective, an illustrative procedure for receiving ad selections.

FIG. 10 shows an illustrative procedure 1000 for receiving ad selections (from the perspective of a user). In operation 1002, the user (or some other entity or module) triggers an ad presentation opportunity. This may correspond to the user's activation of a particular web page, the user's entry of particular information in a text entry box, or any other event.

In operation 1004, the user device 106 or some other module presents an ad request to the ad system 108, e.g., in response to instructions contained in a page served by the affiliate module 102. The ad request instructs the ad system 108 to deliver one or more ad selections in response to the ad presentation opportunity.

In operation 1006, the user receives one or more selected ad units from the ad system 108 in the context of a page delivered by the affiliate module 102. The ad units include the ad selections made by the ad system 108. The user may activate the ad units, upon which, in one case, the user is redirected to the item management module 104. The user may then optionally purchase one or more items.

B.2. Behavior from the Perspective of the Ad System

Figure 11:
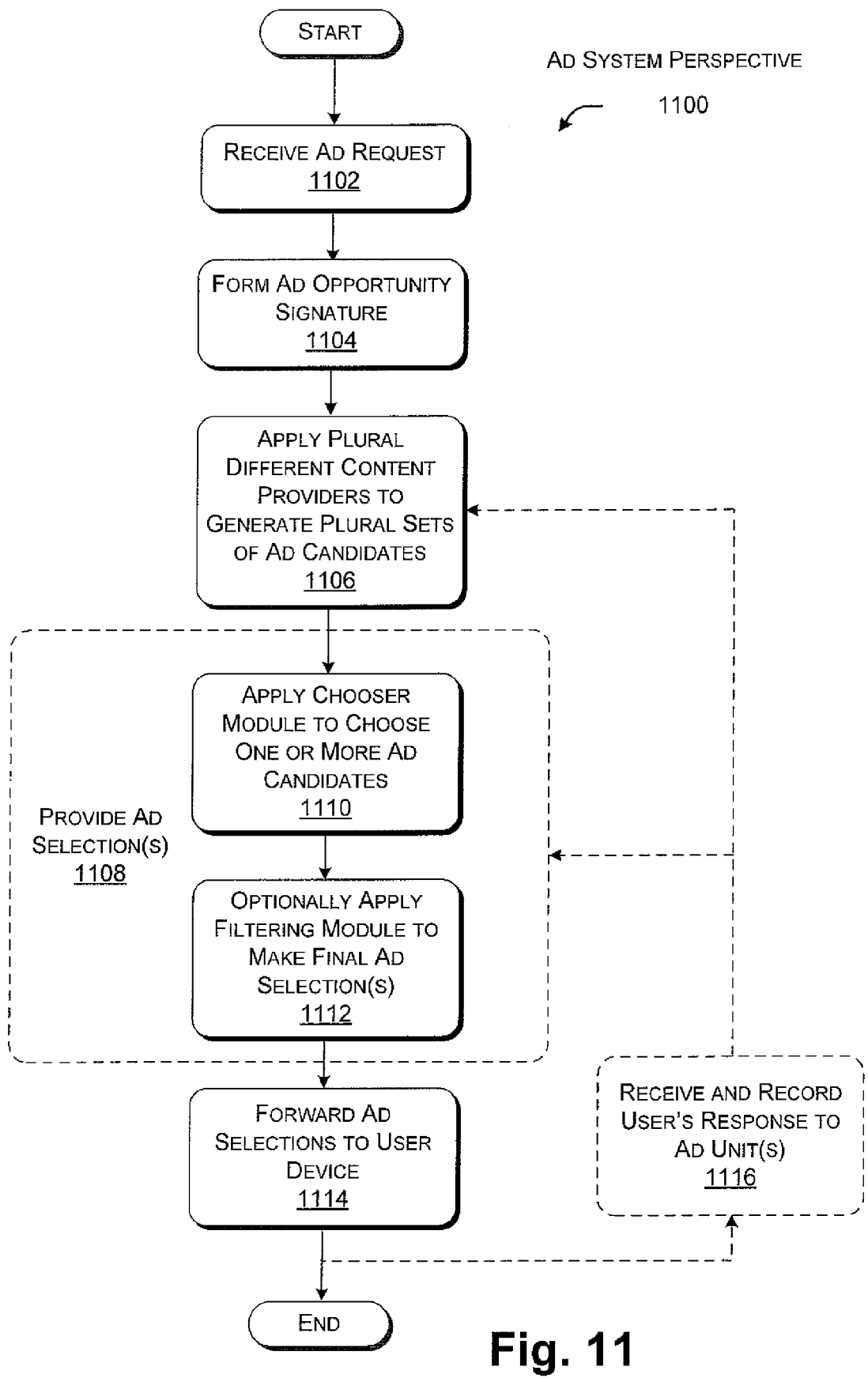
FIG. 11 shows, from the perspective of the ad system as a whole, an illustrative procedure for delivering ad selections.

FIG. 11 shows a procedure 1100 for making one or more ad selections in response to an ad presentation opportunity (from the perspective of the ad system 108). In operation 1102, the ad system 108 receives an ad request in response to the generation of an ad presentation opportunity (as discussed above). In operation 1104, the ad system 108 can form an ad opportunity signature that collects together salient information regarding the ad presentation opportunity.

In operation 1106, the ad system 108 applies plural different content providers to generate different respective sets of ad candidates. As described above, different content providers can apply different paradigms for generating ad candidates. The different paradigms, in turn, may emphasize different aspects of the context in which the ad information is to be presented.

In operation 1108, the ad system 108 generates a final set of ad selections to deliver to the user in response to the ad presentation opportunity. Operation 1108 can include two sub-operations. In sub-operation 1110, the candidate generation module 212 can generate a set of chosen candidates from among the plural sets of ad candidates supplied by the content providers. In sub-operation 1112, the filtering module 214 further refines the set of chosen ad candidates to yield the final set of ad selections. The term "ad candidate" is intended to have broad connotation. In one case, any of the content providers can provide plural creative parts and plural featured item parts (any of which can be considered ad candidates). Although not shown, the operation 1108 can also involve selecting one or more creative parts from plural proposed creative parts. In operation 1114, the ad serving module 112 of the ad system 108 forwards the ad selections to the user.

Finally, operation 1116 indicates that the item management module 104 can record the actions of the user in response to the presentation of the ad selections. Such actions may comprise purchases, click events, shopping cart selections, and so on. As indicated by the feedback path (denoted by a dotted line), the ad system 108 can modify its behavior in response to the performance of the ad selections, such as by adjusting the operation of any learning-type content provider (e.g., by modifying its model) and/or adjusting the weighting assigned to different content providers by the chooser module 302.

B.3. Behavior from the Perspective of Content Providers

Figure 12:
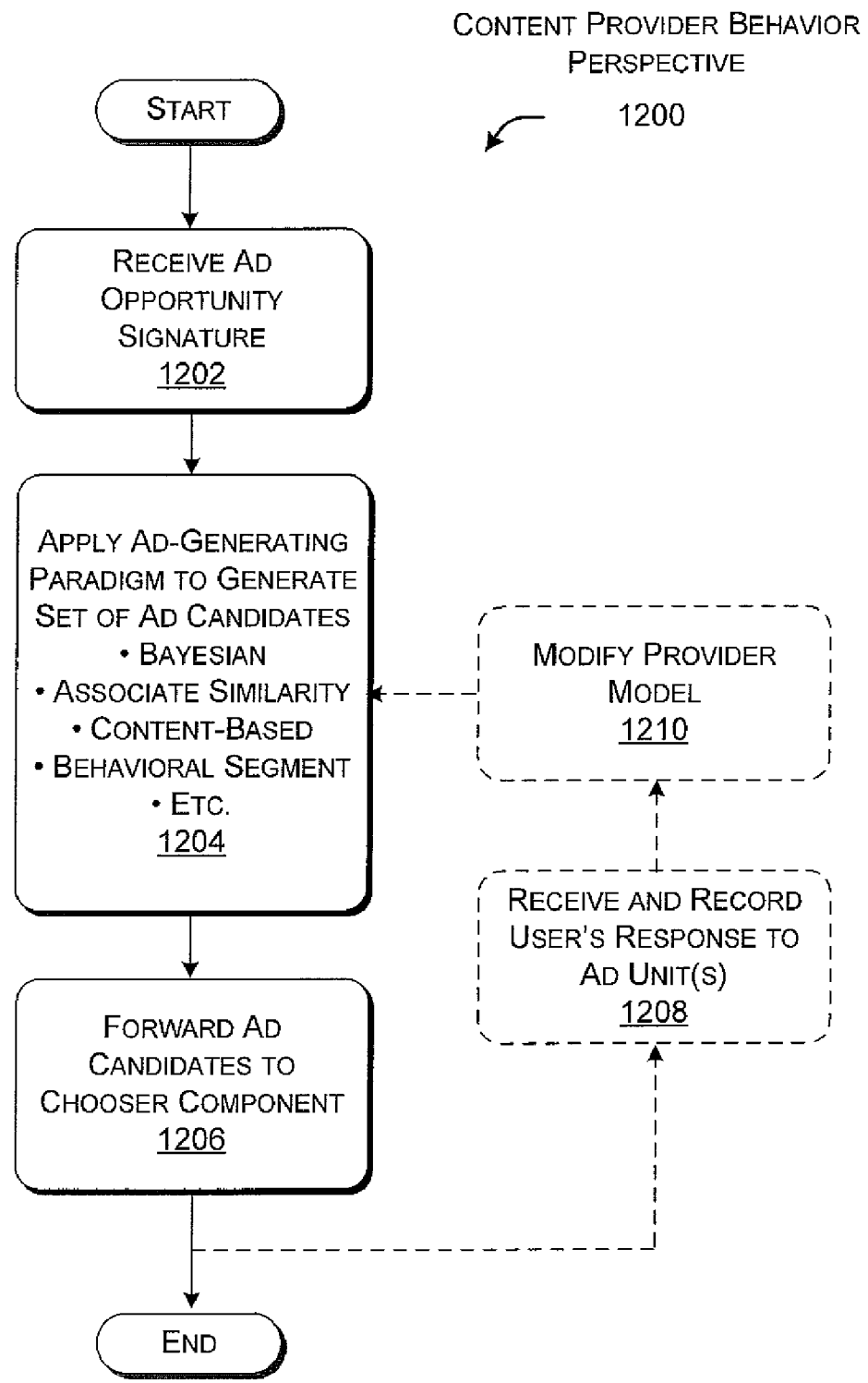
FIG. 12 shows, from the perspective of one of the content providers, an illustrative procedure for generating a set of ad candidates.

FIG. 12 shows a general procedure 1200 for generating a set of ad candidates using a particular paradigm (from the perspective of a content provider). This procedure 1200 applies to any of the above-described content providers.

In operation 1202, the content provider receives an opportunity signature that encapsulates salient information regarding an ad presentation opportunity.

In operation 1204, the content provider applies its particular paradigm to generate a set of ad candidates for presentation to the user. Section A described several different types of ad-generating paradigms, including a Naïve Bayesian paradigm, an affiliate similarity paradigm, a content-based paradigm, a user-related paradigm, and so on. The ad candidates generated by a content provider can encompass one or more creative parts and one or more featured item parts.

In operation 1206, the content provider forwards its set of ad candidates to the chooser module 302. The chooser module 302 may draw from this set of ad candidates in generating its set of chosen candidates (e.g., depending on the weighting assigned to the content provider).

Certain content providers use models which rely on historical performance data, where the performance data (e.g., transaction data) reflects in part user actions in response to receiving the ad selections. For such a content provider, the procedure 1200, in operation 1208, can receive and store user actions. In operation 1210, the content provider can adjust its model (e.g., a Naïve Bayesian model) to account for new performance data collected in operation 1208. This updating operation can be performed on a periodic basis (e.g., once a week) or for every new signature that is received.

Figure 13:
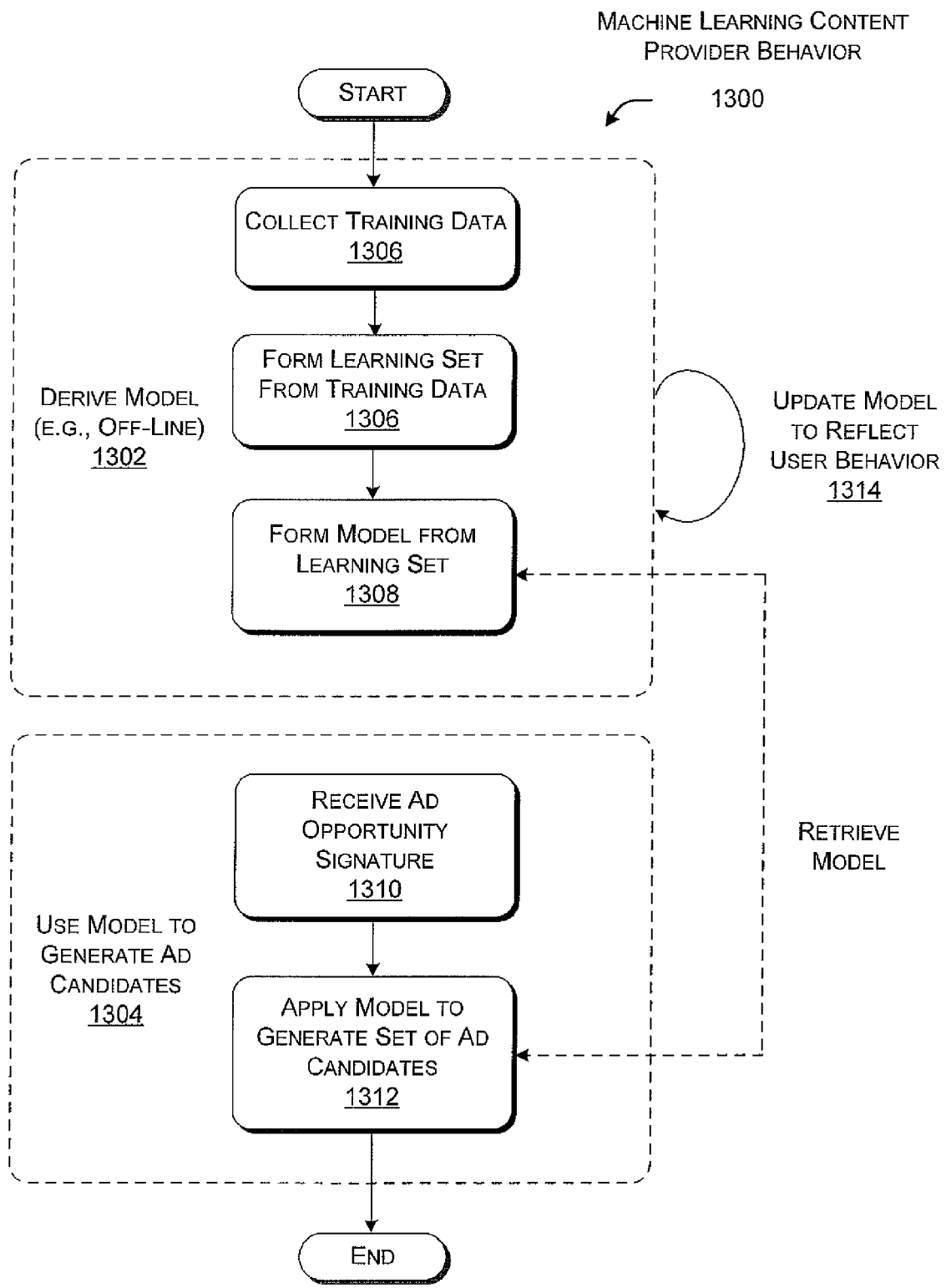
FIG. 13 shows an illustrative procedure for generating ad candidates using a Naïve Bayesian content provider.

FIG. 13 shows a procedure 1300 which more specifically describes the operation of the learning type content provider 402 shown in FIG. 4, such as, but not limited to, a Naïve Bayes content provider. In general training operation 1302, the content provider 402 derives a model based in part on past transaction data stored in the data stores 116. The training operation can be performed in offline fashion by the model generating module 404 of (of FIG. 4). The training operation can be performed offline in the sense that it can be performed prior to the real-time application of the model. In the real-time application of the model, the model is applied to generate ad candidates in response to new ad presentation opportunities.

In general application operation 1304, the content provider 402 applies the model generated in operation 1302. The application operation can be performed by the model application module 406 of FIG. 4. In this operation, the model application module 406 applies the model to new ad presentation opportunities. This operation 1304 produces ad candidates for presentation to users.

As to the training operation 1302, in operation 1306, the content provider 402 can collect information from the data stores 116 that is relevant to the behavior of users in interacting with ad information. For instance, the content provider 402 can collect information regarding ad opportunity signatures associated with prior ad presentation opportunities. The content provider 402 can also collect information that identifies what actions the users may have taken in response to the ad presentation opportunities.

In operation 1308, the content provider 402 can compile a learning set 408 from the collected transaction data and other data (such as information extracted from the ad opportunity signature). The learning set 408 can be expressed as a table as described above. The learning set can arrange information regarding the collected ad opportunity signatures and subsequent user actions in a prescribed manner, e.g., as described above in section A.6(a).

In operation 1310, the content provider 402 forms the model using the learning set 408. For instance, the algorithms set forth in section A.6(a) provide an illustrative technique for forming a Naïve Bayes model.

As to the model application operation 1304, in operation 1310, the content provider 402 receives a new ad opportunity signature. The new ad opportunity signature is formed in response to the occurrence of a new ad presentation opportunity. More specifically, for instance, a user may receive a page from an affiliate module containing an ad slot. The ad slot represents a new ad presentation opportunity.

In operation 1312, the content provider 402 applies the model generated in operation 1302 to map the new ad opportunity signature to a set of ad candidates that are likely to provide desired results (e.g., which are likely to elicit user action of some kind). This operation 1312 comprises inputting various features of the ad opportunity signature into the model, and, in response, receiving a set of ad candidates. The model can generate the ad candidates using the algorithms set forth in section A.6(a).

The general looping operation 1314 indicates that the content provider 402 can collect new transaction data to reflect recent user behavior concerning the delivered ad information, and then use this new transaction data to update its model. This updating operation allows the model to address new types of ad presentation opportunities, changes in user behavior, and/or other factors.

Figure 14:
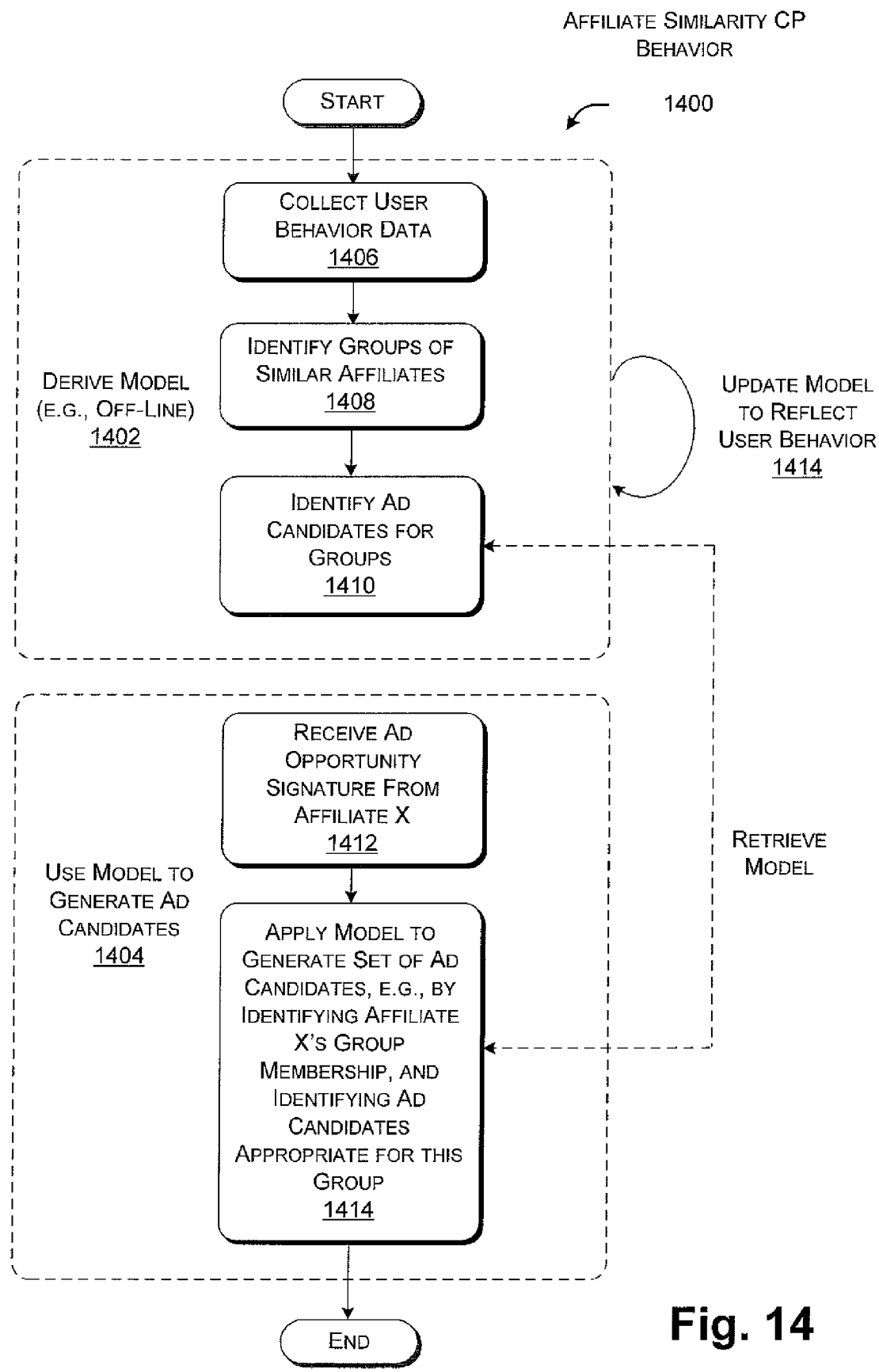
FIG. 14 shows an illustrative procedure for generating ad candidates using an associate similarity content provider.

FIG. 14 shows a procedure 1400 which more specifically describes the operation of the affiliate similarity content provider 502 of FIG. 5. Section A.6(b) describes one implementation of the affiliate similarity content provider 502.

In general training operation 1402, the content provider 502 derives a model based in part on past transaction data. This operation may be performed in offline fashion by the model generating module 504 of FIG. 5. The training operation 1402 can be performed offline in the sense that it can be performed prior to the real-time application of the model. In the real-time application of the model, the model is applied to generate ad candidates in response to new ad presentation opportunities.

In general application operation 1404, the content provider 502 applies the model generated in operation 1402. The application operation 1404 can be performed by the model application module 506 of FIG. 5. In this operation, the model application module 506 applies the model to new ad presentation opportunities.

As to the training operation 1402, in operation 1406, the content provider 502 can collect information from the data stores 116 that is relevant to the behavior of users in interacting with ad selections. For instance, the content provider 502 can collect information regarding ad opportunity signatures associated with prior ad presentation opportunities. For instance, the information regarding the ad opportunity signatures can identify the affiliate modules associated with the ad presentation opportunities. The content provider 502 can also collect information that identifies what actions the users may have taken in response to the ad presentation opportunities.

In operation 1408, the content provider 502 can identify groups of similar affiliate modules. Two or more affiliate modules are assessed as being similar if they generate similar ad candidates that elicit similar behavior from users. Section A.6(b) describe in detail one illustrative algorithm for identifying groups of similar affiliate modules.

In operation 1410, the content provider 502 determines ad candidates that may be appropriate for the groups identified in operation 1408. For example, the ad candidates that are appropriate for a group that includes affiliate module $A_1$ and affiliate module $A_2$ may comprise a union of the sets of ad candidates $(S_1, S_2)$ typically generated by these two affiliate modules $(A_1, A_2)$.

As to the model application operation 1404, in operation 1412, the content provider 502 receives a new ad opportunity signature. That is, the new ad opportunity signature is formed in response to the occurrence of a new ad presentation opportunity. More specifically, for instance, a user may receive a page from the affiliate module $A_1$ containing an ad slot. The ad slot represents a new ad presentation opportunity.

In operation 1414, the content provider 502 applies the model generated in operation 1402 to map the ad opportunity signature to a set of ad candidates that are likely to provide desired results (e.g., which are likely to elicit user action of some kind). This may involve selecting any of the ad candidates identified in operation 1410.

The general looping operation 1414 indicates that the content provider 502 can collect new transaction data to reflect recent user behavior concerning the delivered ad information, and then use this new transaction data to update its model.

B.4. Behavior from the Perspective of the Chooser Module

Figure 15:
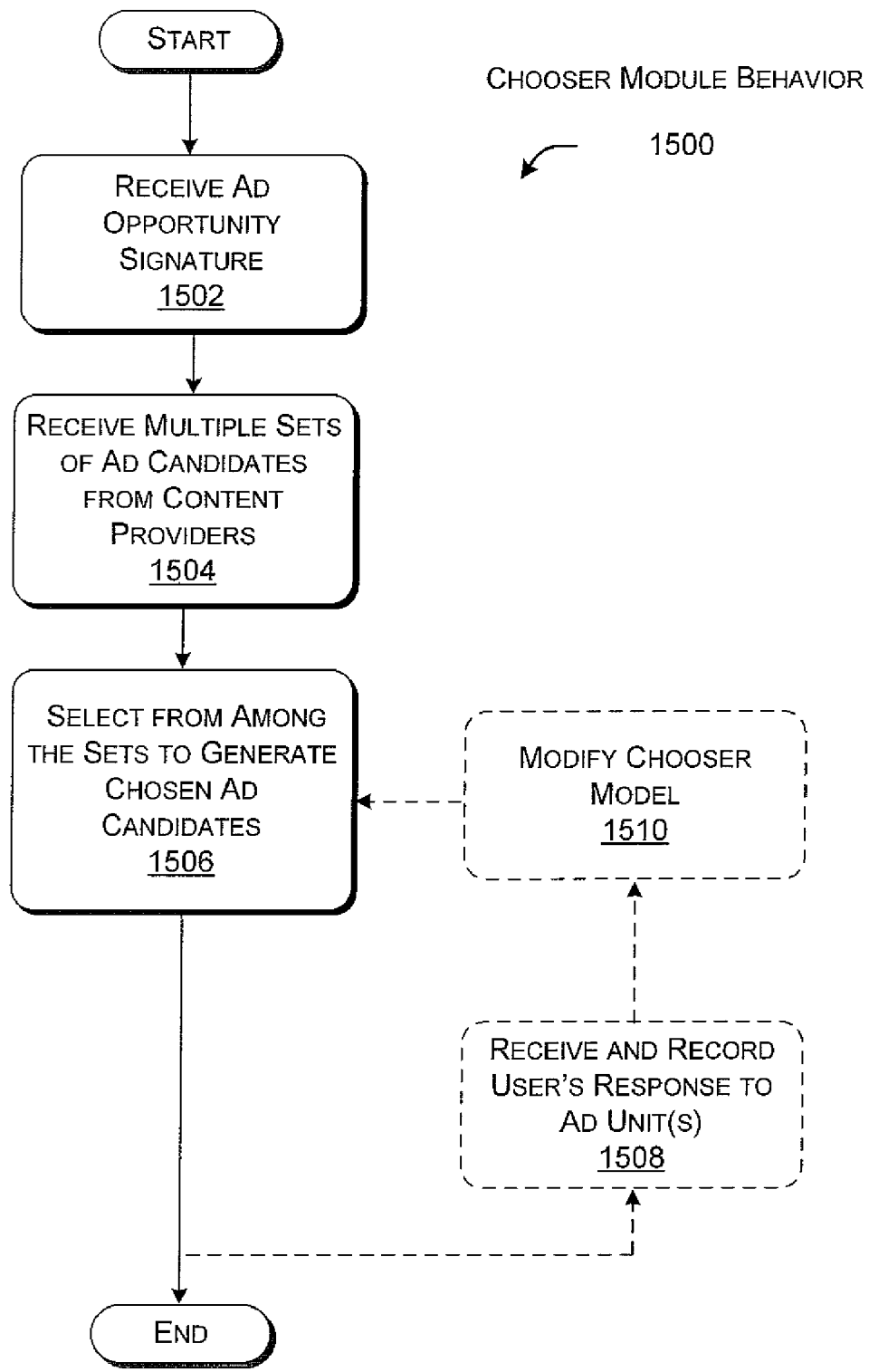
FIG. 15 shows, from the perspective of the chooser module, an illustrative procedure for choosing ad candidates from among plural sets of ad candidates.

FIG. 15 shows a procedure 1500 for creating a chosen set of ad candidates from different sets of ad candidates generated by plural content providers (from the perspective of the chooser module 302).

In operation 1502, the chooser module 302 receives an ad opportunity signature. This ad opportunity signature is generated in response to an ad presentation opportunity. The ad opportunity signature expresses salient information regarding the ad presentation opportunity.

In operation 1504, the chooser module 302 receives multiple sets of ad candidates from respective content providers. As described above, different content providers may use different selection paradigms to generate their respective sets of ad candidates. In one implementation, the chooser module 302 may consider a sales commitment for each of a plurality of affiliate components. For example, the chooser module 302 may favor ad candidates from affiliate components that are nearing a higher commission tier, which provide higher profit margins, and so forth.

In operation 1506, the chooser module 302 can dynamically select a set of chosen ad candidates from the multiple sets based on weights applied to the corresponding content providers. For example, the content provider may use a model (such as, but not limited to, a Naïve Bayes model) to generate weights associated with different content providers. As described in detail in section A, when the weights are applied to the content providers, they have the effect of favoring some content providers over other content providers. The weighting module 808 of FIG. 8 can perform the role of applying weights to different sets of ad candidates, while the mapping module 810 can select among the weighted ad candidates to generate a chosen set of ad candidates (which is then optionally forwarded to the filtering module 214).

The chooser module 302 may use a model (such as, but not limited to, the Naïve Bayes model) which relies on historical performance data, where the performance data (e.g., transaction data) reflects user actions upon receiving the ad units. For such a chooser module 302, the procedure 1500, in operation 1508, can receive and store user actions. In operation 1510, the chooser module 302 can adjust its model to account for new performance data collected in operation 1508. This updating operation can be performed on a periodic basis (e.g., once a week) or for every new signature that is received. The model determines the weights applied to the content providers in operation 1506.

Although not shown, the chooser module 302 can also play a role in selecting a creative part (or parts) from among plural candidate creative parts. The chooser module 302 can perform this task by making reference to various rules and considerations.

Although the invention has been described in language specific to structural features and/or methodological acts, it is to be understood that the invention defined in the appended claims is not necessarily limited to the specific features or acts described. Rather, the specific features and acts are disclosed as illustrative forms of implementing the claimed invention.

A tag identifier may be assigned to an affiliate module, and each affiliate module may have more than one tag identifier, or "TagID." An ad opportunity signature may comprise the tag identifier of the affiliate module. Similarly, each ad candidate may comprise a unique identifier, or "UID", which references that specific advertisement or creative.

The ad selection module 110 may choose which of the ad candidates to present at the affiliate module in response to the ad opportunity signature by associating the tag identifiers with the unique identifiers in a matrix. Based on the associations derived from the matrix, it is possible to determine clusters in the unique identifier space. This clustering may then be used to rank which ad candidate should be placed with a given ad opportunity.

Tags that are "similar" to a particular tag give an indication of what unique identifiers are suitable for that tag. Starting with a tag t, it is possible to find unique identifiers associated with the tag, then find tags associated with those unique identifiers, and finally find unique identifiers associated with those tags. The aim is to discover new unique identifiers that are strongly associated with this tag t. In this implementation, tags are clustered based on initial data containing associations between unique identifiers and tags. Similar tags are then used as an indication of what unique identifiers are suitable for a particular tag.

In this implementation, the ad selection module uses data comprising tag values and the corresponding unique identifiers for each click by the user. A number of clicks on a particular (tag, unique identifier) pair is used as a measure of the degree of association between the tag and the unique identifier.

This data is used to generate a matrix where rows correspond to tags and columns correspond to unique identifiers. Each entry in the matrix contains a value equal to the number of clicks corresponding to that (tag, unique identifier) pair. This may result in rows corresponding to tags with lots of clicks to have larger magnitude. By dividing each entry in the matrix by the magnitude of this row, this large magnitude is adjusted. In other words, all of the values in a row are treated as components of a vector and this vector is converted into a unit vector. This ensures that the unique identifier-association data for each tag has equal importance. Let this matrix be designated "M." Each value in M represents the degree of association between a tag and unique identifier, with a higher value meaning greater association. Next, the matrix $MM^T$ is computed which provides a degree of association between the different tags. A matrix R is computed as $R=MM^TM$, which contains new values of association between each tag and unique identifier. These values may now be used to rank unique identifiers for a particular tag.

Data other than clicks may prove useful. For example, the number of impressions may be factored into the matrix M and the click-through rate ("CTR") may provide useful initial data. In addition, a number of units might also be considered.

There are distinct groups of tags such that all tags in a particular group are highly associated to certain unique identifiers. Where this consideration is true, this method can exploit these clusters to discover new associations starting from the initial data. For example, consider that there exists a tag-unique identifier pair (t, a) such that a is highly associated to t but the ad corresponding to a was never placed on the webpage corresponding to t; in this case, this association could be learned via other associations of the form (t', a) that exist in the data where t' is a tag that belongs to t's cluster.

What is claimed is:

1. An ad-serving system executable on one or more processors for providing ad selections, comprising:
    an item management module for offering items to users, the item management module including a data store for maintaining a catalog of the items being offered;
    a plurality of content providers each having a plurality of advertisements and each advertisement being associated with a unique identifier, a plurality of affiliate modules for interacting with the users, each affiliate module having one or more tag identifiers; and an ad system for generating ad selections which are associated with the items being offered by the item management module, the ad selections being presentable to the users in the context of electronic services provided by the plurality of affiliate modules, wherein the ad system comprises:

an ad serving module for providing ad selections to the users; and an ad selection module for generating ad selections to be delivered to the users, wherein the ad selection module is operative to generate the ad selections by choosing from plural sets of ad candidates, the choosing based at least in part on a ranking of the unique identifiers for a particular one of the tag identifiers, each set being obtained from a respective one of the plurality of content providers and the plural set of ad candidates being provided using plural respective ad selection paradigms, wherein the ad selection module is operative to generate the ad selections based on at least one aspect of an ad presentation context, said at least one aspect comprising text adjacent to an ad space designated for presentation of an ad.

2. The system of claim 1, wherein said least one aspect of the ad presentation context further comprises one or more of:

an aspect that pertains to one or more characteristics of content with which the users interact;

an aspect that pertains to one or more characteristics of the affiliate modules; or an aspect that pertains to one or more characteristics of the users.

3. A computerized method for generating one or more ad candidates, comprising:

in response to an ad presentation opportunity at an affiliate component, receiving plural sets of ad candidates using plural respective ad selection paradigms, each set being received from a respective one of a plurality of content providers and each set comprising a tag identifier associated with the affiliate component; and choosing one or more of the ad candidates each having a unique identifier from the plural sets of the ad candidates to provide one or more chosen ad candidates, the choosing based at least in part on text adjacent to one or more ad spaces designated for presentation of the chosen ad candidates.

4. The computerized method of claim 3, further comprising forwarding said one or more chosen ad candidates to a user.

5. The computerized method of claim 3, further comprising filtering said one or more chosen ad candidates based on at least one filtering criterion to provide one or more ad selections.

6. The computerized method of claim 5, wherein said at least one filtering criterion directs the removal of one or more chosen ad candidates associated with items that have an undesirable availability status.

7. The computerized method of claim 5, wherein said at least one filtering criterion directs the removal of one or more chosen ad candidates that are assessed as duplicates.

8. The computerized method of claim 5, wherein said at least one filtering criterion directs the removal of one or more chosen ad candidates having undesirable content.

9. The computerized method of claim 3, wherein the choosing further comprises selecting at least one creative part that governs a manner in which ad information is presented to a user.

10. The computerized method of claim 9, wherein at least one creative part provides a directive to present a single featured item part.

11. The computerized method of claim 9, wherein at least one creative part provides a directive to present plural featured item parts.

12. The computerized method of claim 3, wherein the generating of plural sets of ad candidates is based on one or more aspects of a context associated with the ad presentation opportunity.

13. The computerized method of claim 12, wherein an aspect of the context pertains to one or more characteristics of content with which a user is interacting.

14. The computerized method of claim 12, wherein an aspect of the context pertains to one or more characteristics of an affiliate module with which a user is interacting.

15. The computerized method of claim 12, wherein an aspect of the context pertains to one or more characteristics of a user.

16. The computerized method of claim 3, further comprising recording a user's action in response to a presentation of said one or more chosen ad candidates.

17. The computerized method of claim 3, wherein a model is used to generate at least one of the plural sets of ad candidates, further comprising modifying the model in response to feedback concerning actions taken by users in response to being served ad candidates.

18. The computerized method of claim 3, wherein a model is used to perform the choosing, further comprising modifying the model in response to feedback concerning actions taken by users in response to being served ad candidates.

19. The computerized method of claim 18, wherein the choosing uses a Bayesian model to generate said one or more chosen ad candidates.

20. The computerized method of claim 19, wherein the Bayesian model uses a Naïve Bayesian classification paradigm.

21. The computerized method of claim 3, wherein the chosen ad candidates are presented to a user in the form of at least one ad unit, further comprising receiving a configuration selection that customizes a characteristic of said at least one ad unit.

22. The computerized method of claim 21, wherein the received configuration selection governs an appearance of said at least one ad unit.

23. The computerized method of claim 21, wherein the received configuration selection governs information imparted by said at least one ad unit.

24. The computerized method of claim 21, wherein the received configuration selection governs a functional behavior of said at least one ad unit.

25. An ad system for generating ad candidates, comprising:

logic executed on one or more processors to identify an ad presentation opportunity, the ad presentation opportunity having a context, wherein the context has one or more aspects selected from one or more characteristics of content with which a user is interacting, wherein at least one of the one or more characteristics comprises text adjacent to an ad space in the content designated by the ad presentation opportunity; and logic executed on one or more processors to generate ad candidates from sets of ad candidates received from a plurality of content providers using plural ad selection paradigms, wherein different ad selection paradigms provide ad candidates that are associated with different respective aspects of the context.

26. The ad system of claim 25, wherein the one or more characteristics of the content further comprises one or more characteristics of an affiliate module with which the user is interacting.

27. The ad system of claim 25, wherein the one or more characteristics of the content further comprises one or more characteristics of the user.

28. A computer-implemented method for choosing one or more ad candidates from plural sets of ad candidates, comprising:
under control of one or more computer systems configured with executable instructions,
receiving a request for an ad selection from an affiliate component, the request comprising a tag identifier associated with the affiliate component;
receiving plural sets of ad candidates from a plurality of content providers and generated based on respective different ad selection paradigms, each ad candidate having a unique identifier and each of the plural sets of ad candidates being received from a respective one of a plurality of content providers;
deriving weights from a unit vector matrix comprising the tag identifiers and the unique identifiers;
applying the weights to the respective ad selection paradigms; and
choosing one or more ad candidates from the plural sets of ad candidates based at least in part on the weights applied to the ad selection paradigms, text adjacent to an ad space designated for presentation of an ad, and a sales commitment for each of the plurality of affiliate components.

29. The computerized method of claim 28, further comprising generating the weights using a model, wherein the model is derived based at least in part on past performance of ad selections served to users for different ad presentation opportunities.

30. The computerized method of claim 29, wherein the model uses a Bayesian approach to generate the weights.

31. One or more computer-readable storage media containing computer-readable instructions, the instructions implementing an ad generation component when executed by one or more processors, the computer readable instructions comprising:
logic operative to, in response to an ad presentation opportunity from an affiliate component, receive from a plurality of content providers plural sets of ad candidates from a plurality of content providers, wherein each ad candidate has a unique identifier and each of the plurality of content providers uses plural respective ad selection paradigms;
logic operative to choose one or more of the ad candidates from the plural sets of the ad candidates to provide one or more chosen ad candidates, the logic being further operative to choose based at least in part upon text adjacent to an ad space designated for presentation of an ad; and
logic operative to filter said one or more chosen ad candidates based on at least filtering criteria comprising a dynamic revenue share configured to facilitate achievement of a pre-determined earnings level of one or more of the plurality of affiliate components.

32. The one or more computer-readable storage media of claim 31, wherein the logic operative to generate plural sets of ad candidates is operative to generate the sets based on one or more aspects of a context associated with the ad presentation opportunity.

33. The one or more computer-readable storage media of claim 32, wherein an aspect of the context pertains to one or more characteristics of content with which a user is interacting.

34. The one or more computer-readable storage media of claim 32, wherein an aspect of the context pertains to one or more characteristics of an affiliate module with which a user is interacting.

35. The one or more computer-readable storage media of claim 32, wherein an aspect of the context pertains to one or more characteristics of a user.

* * * * *